United States Patent Office 3,469,367
Patented Sept. 30, 1969

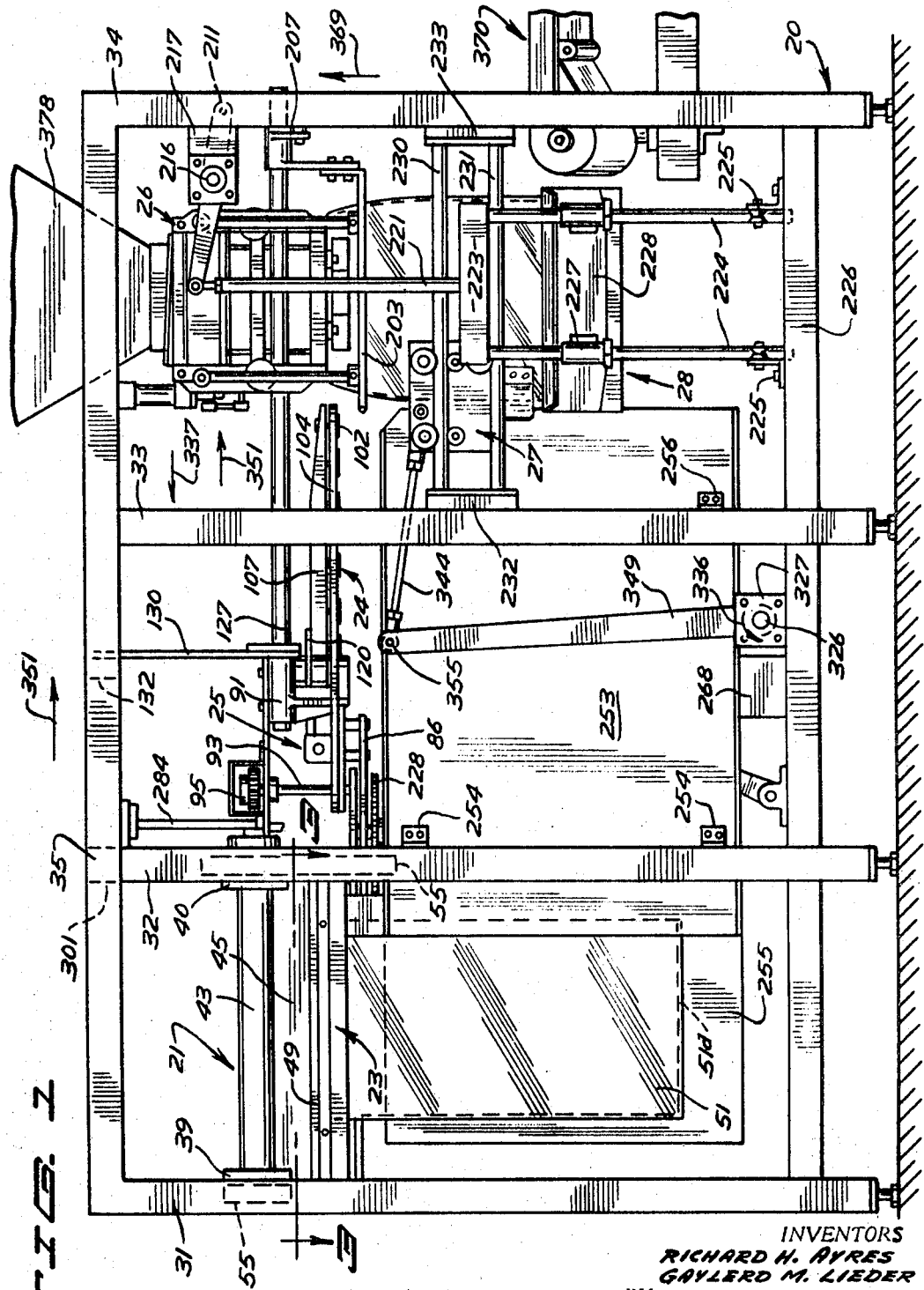

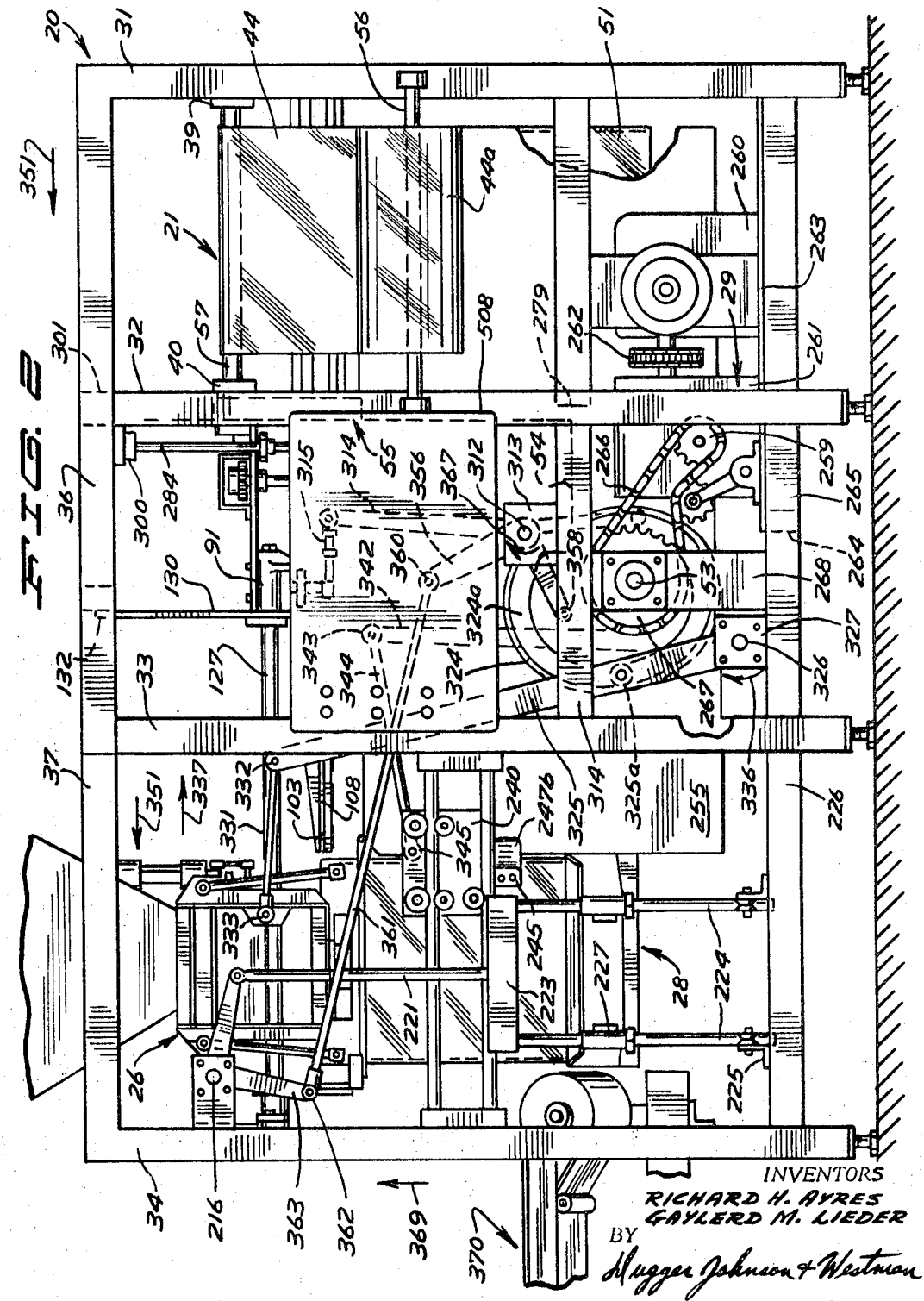

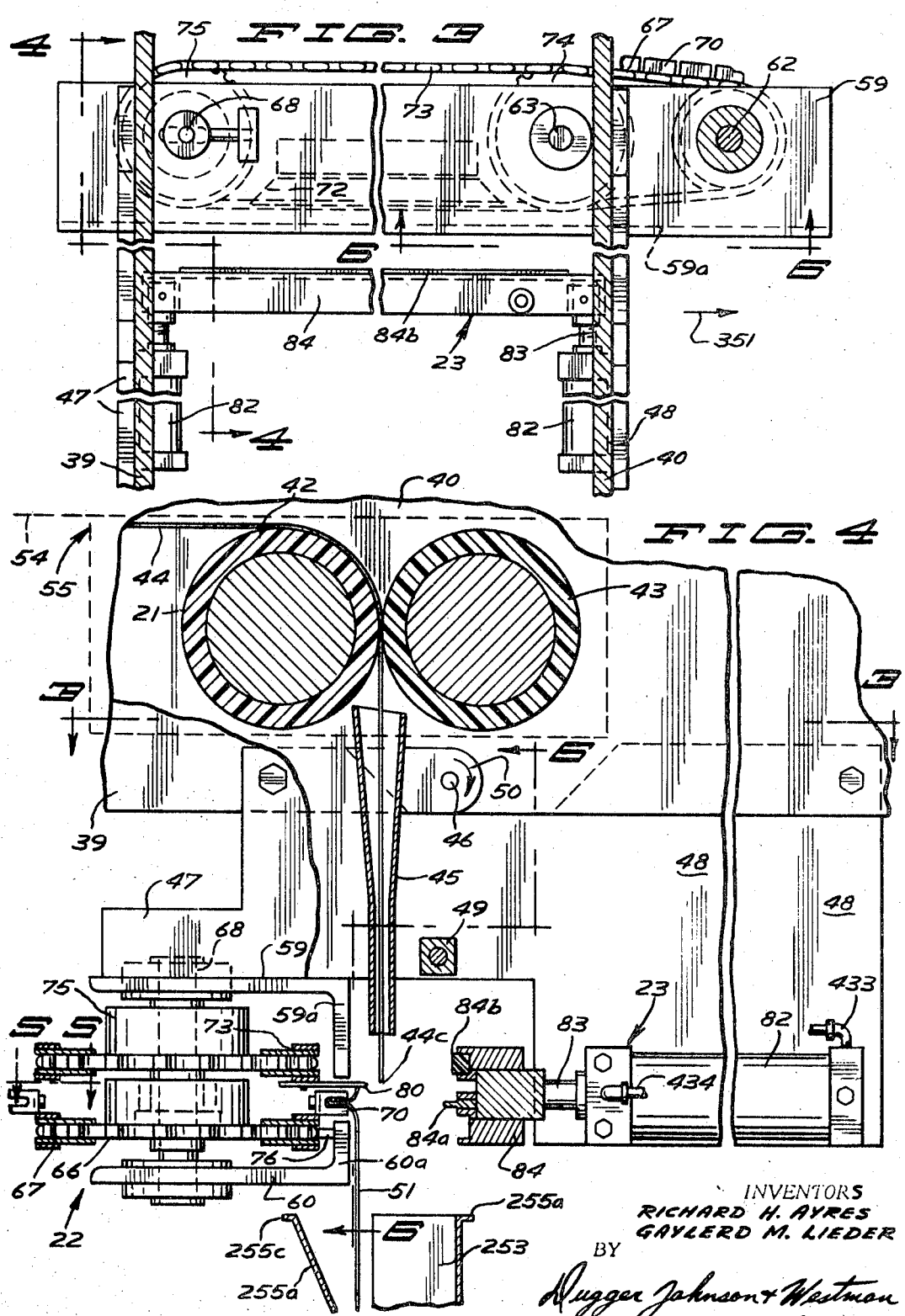

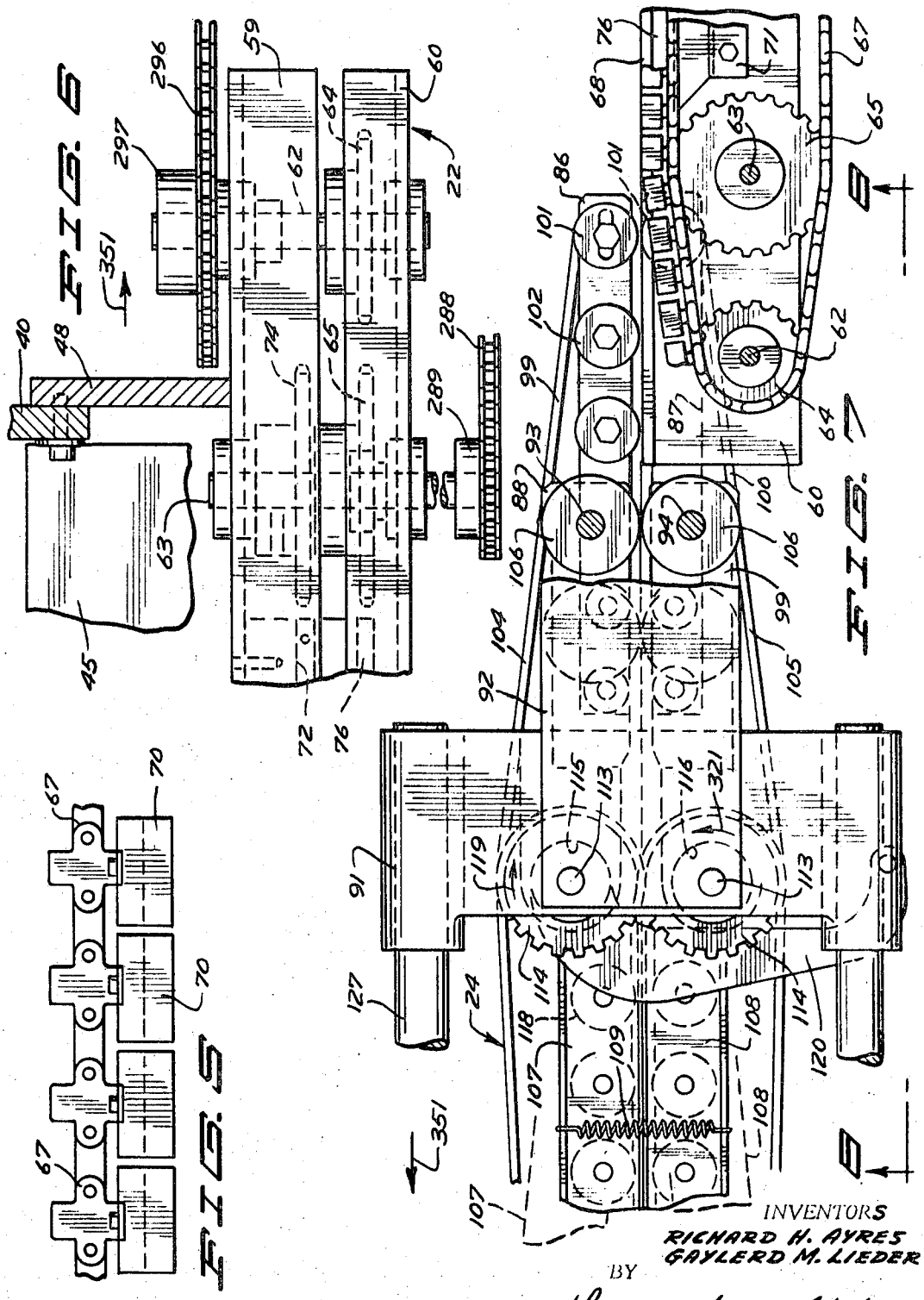

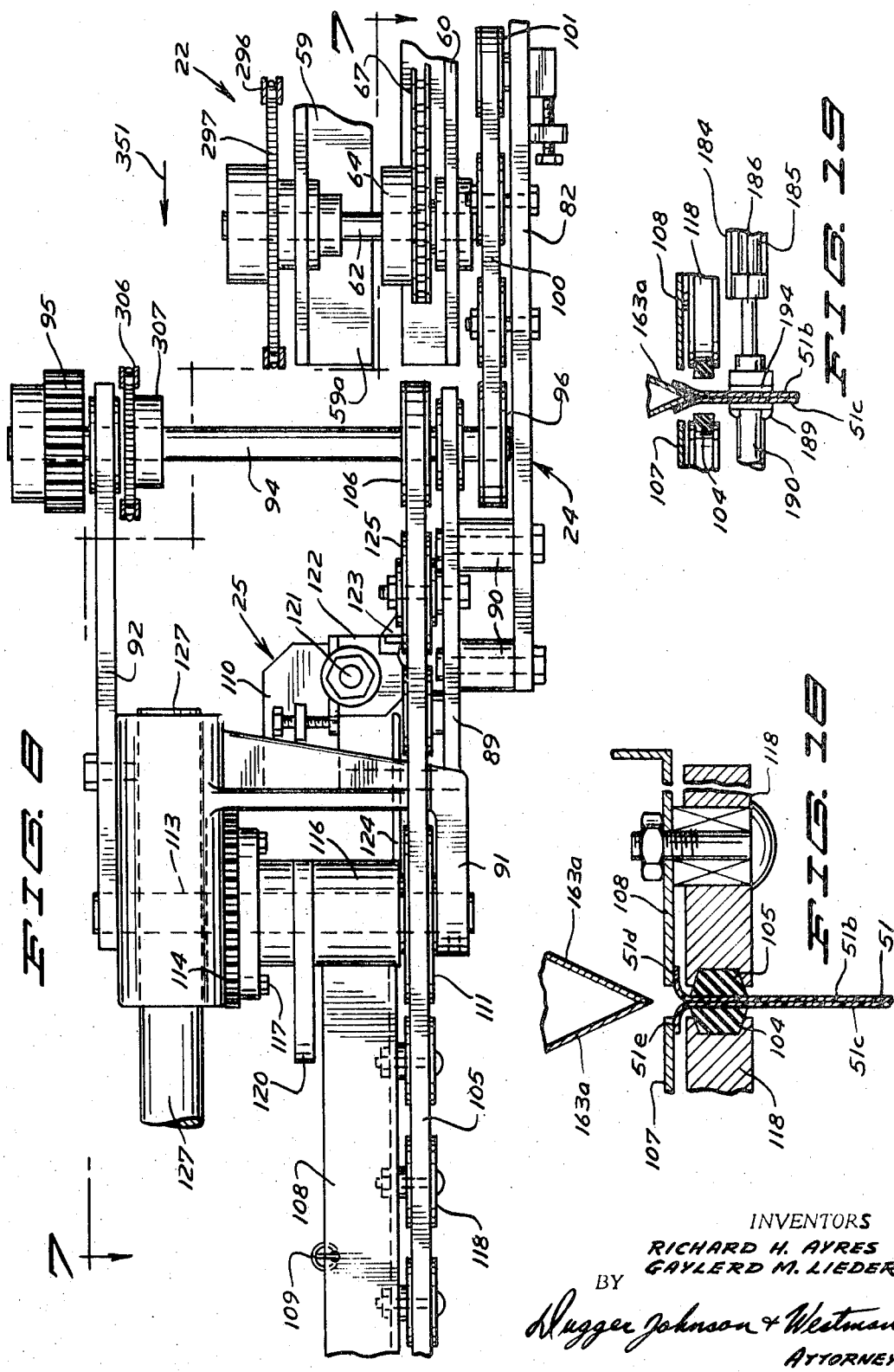

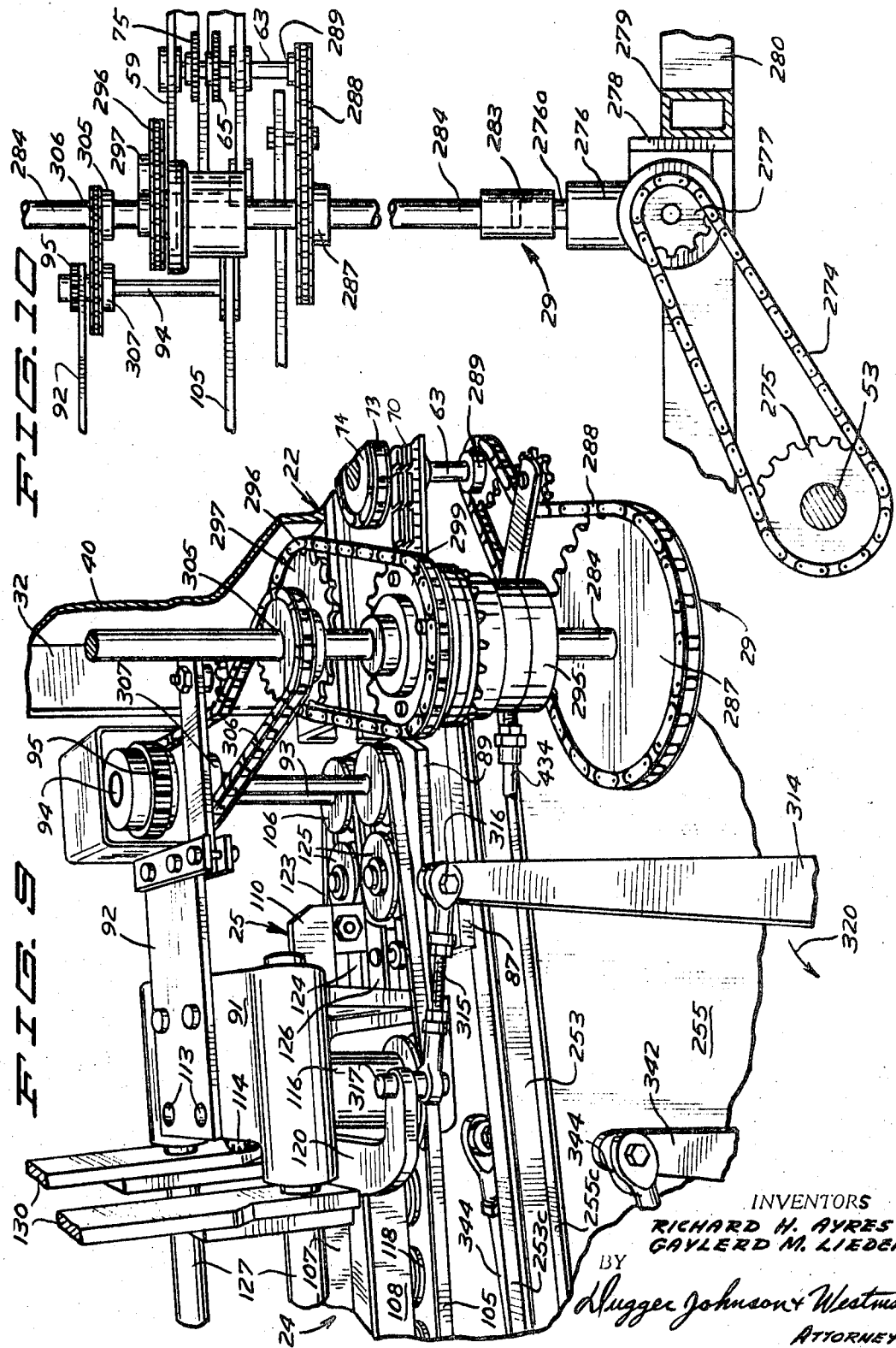

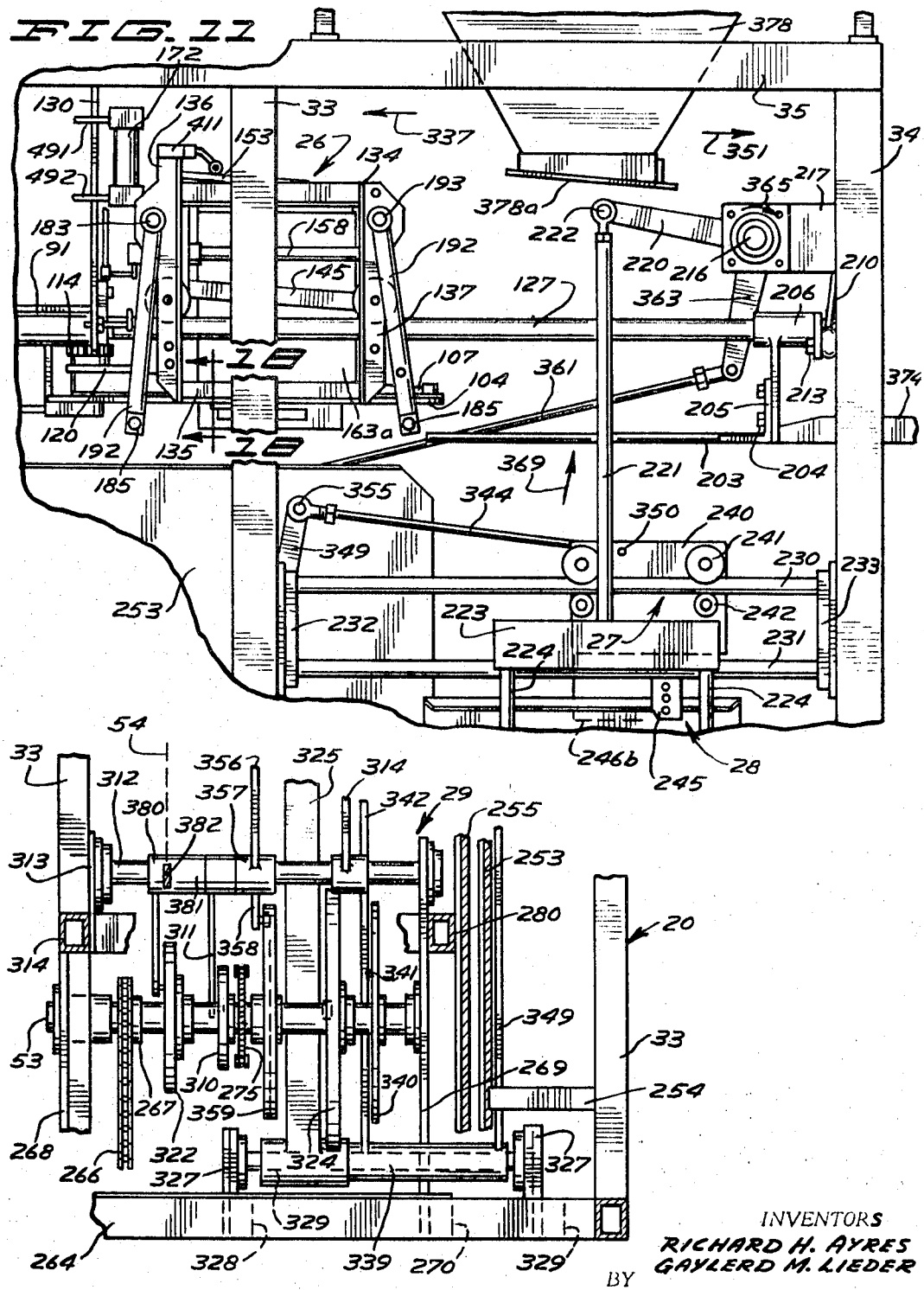

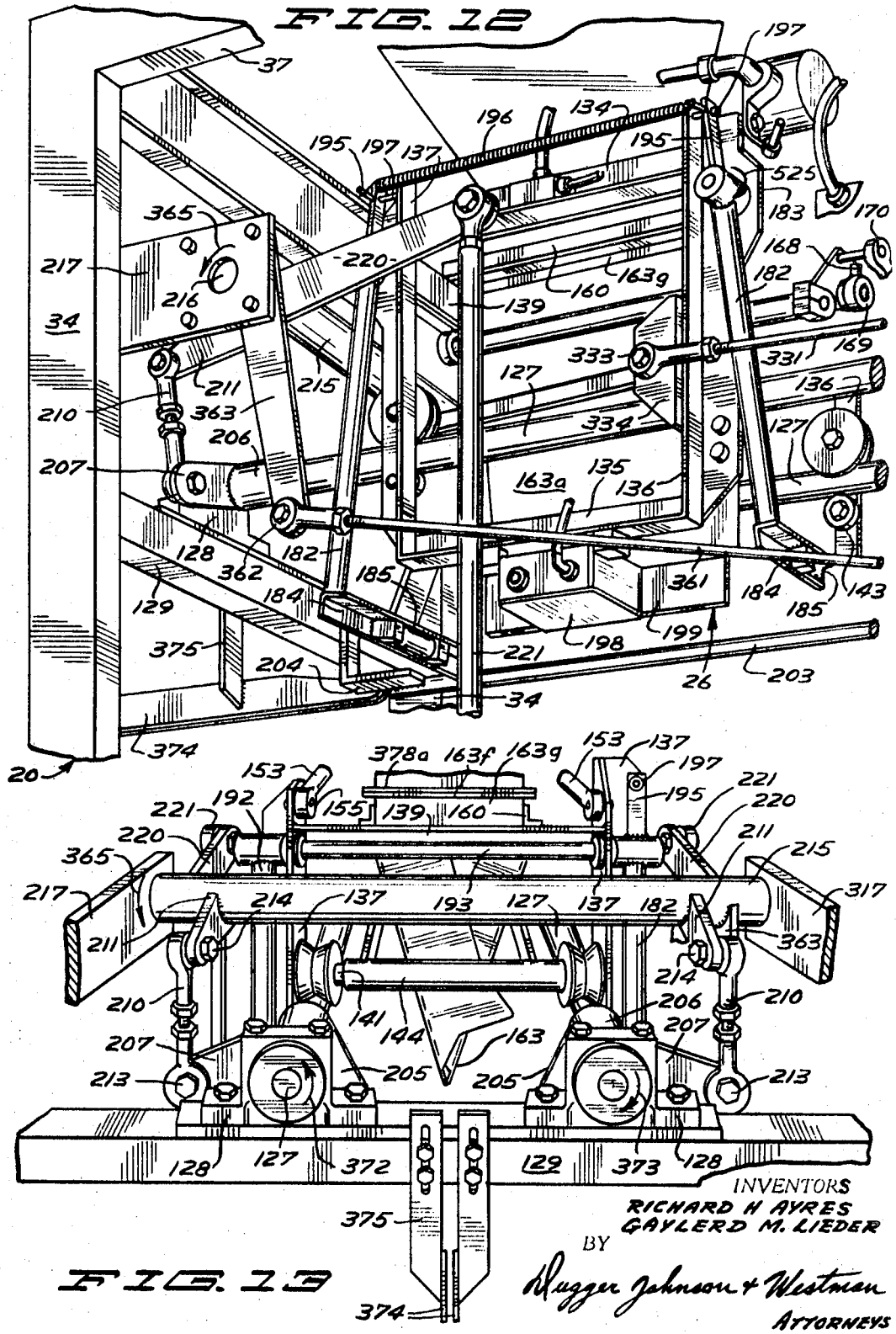

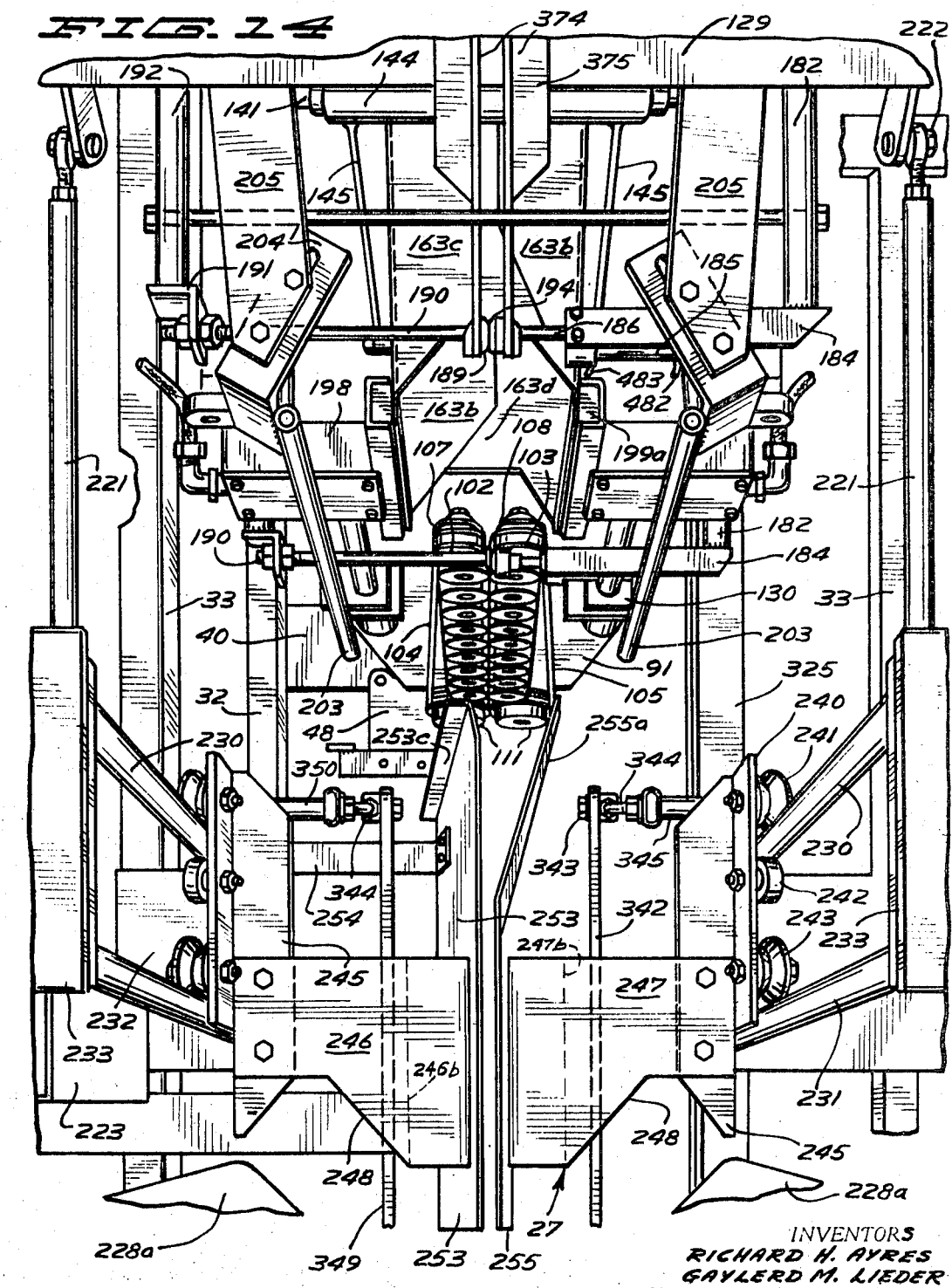

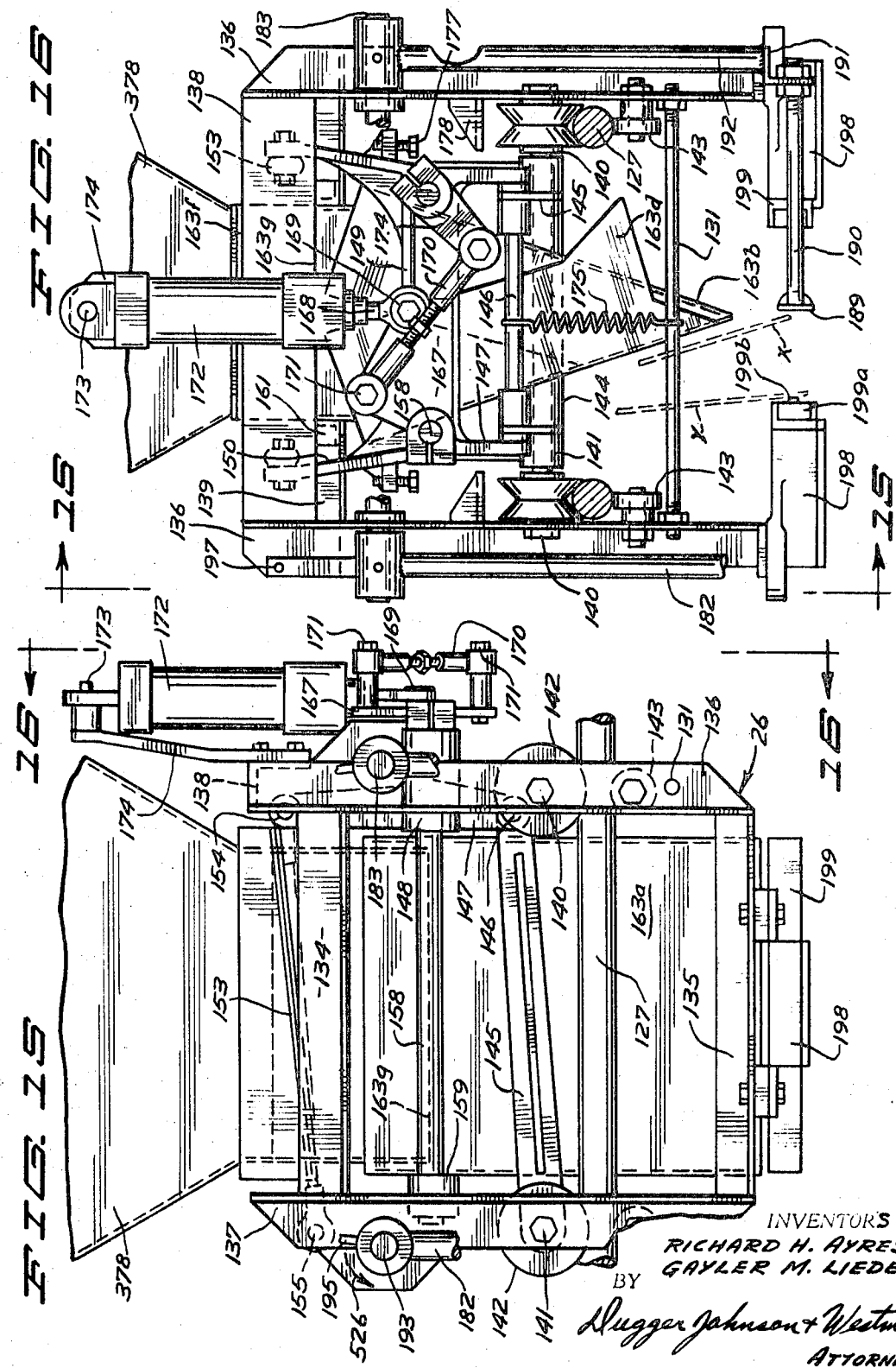

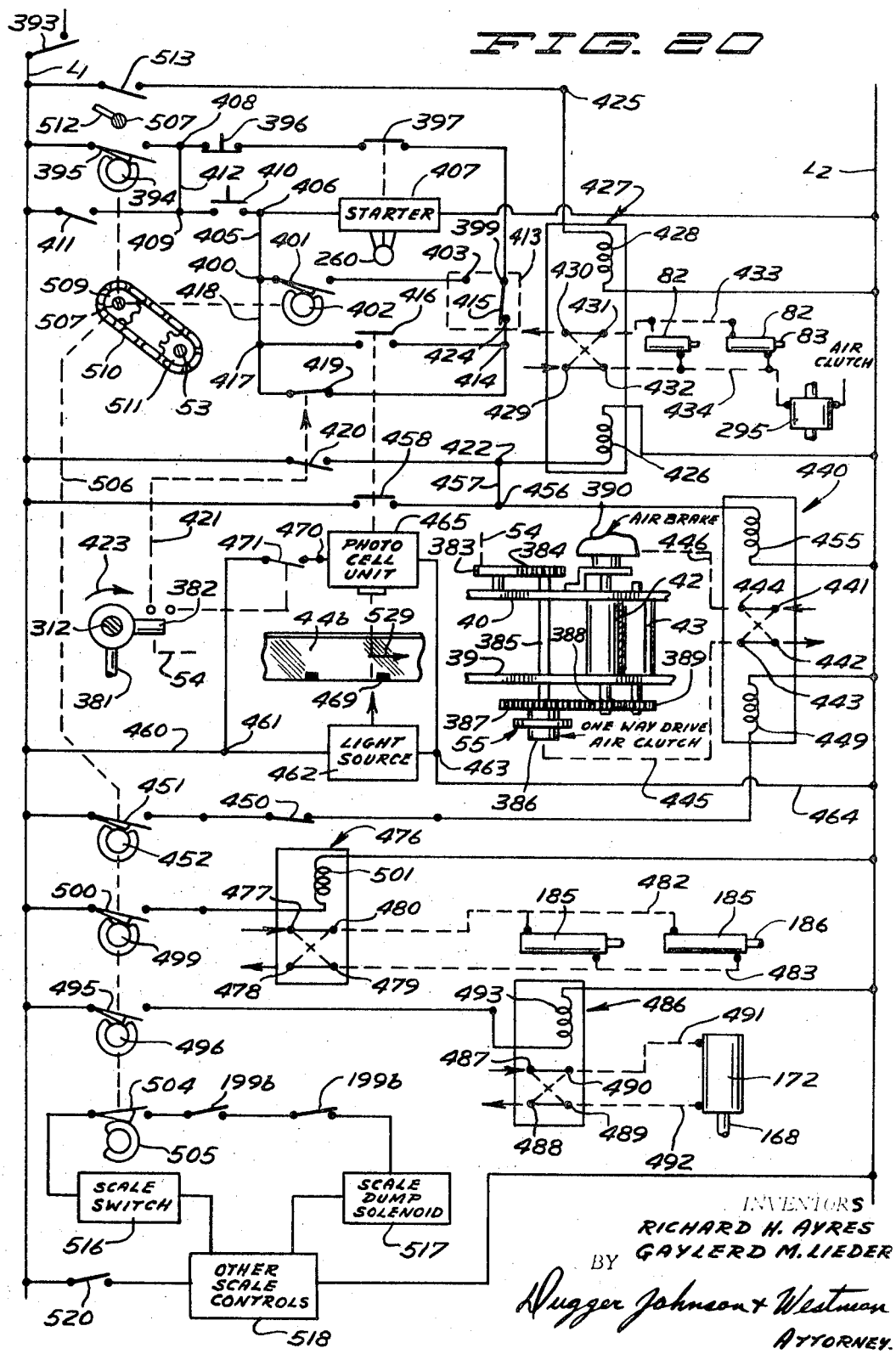

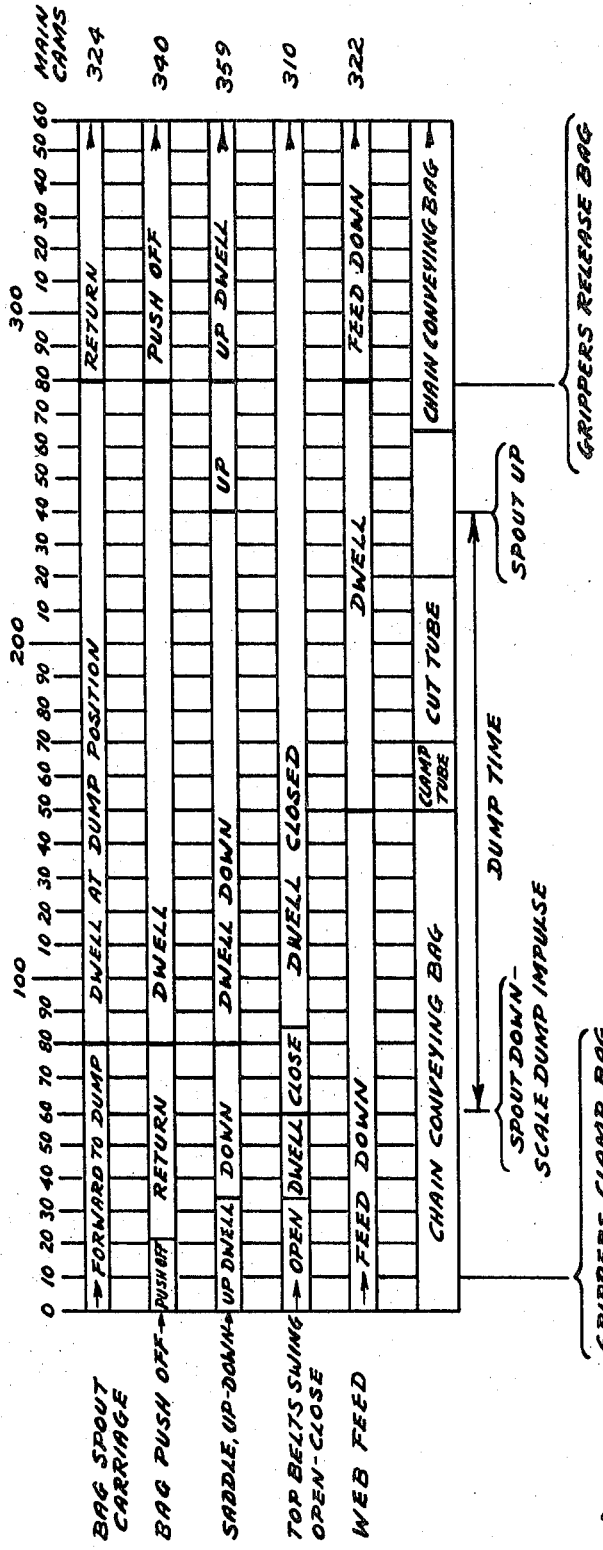

3,469,367
BAG FEEDING AND FILLING APPARATUS
Richard H. Ayres and Gaylerd M. Lieder, Minneapolis, Minn., assignors to Bemis Company, Inc., Minneapolis, Minn., a corporation of Missouri
Filed May 31, 1966, Ser. No. 553,990
Int. Cl. B65b 3/03, 39/02, 43/04
U.S. Cl. 53—187                                46 Claims

ABSTRACT OF THE DISCLOSURE

Apparatus having means to feed a continuous tubular web adjacent a knife that severs a tubular member from the web while the web is partially supported from a first conveyor, a second endless conveyor that receives and moves the tubular member past a second knife to spread its upper marginal edge portions and thence transfers the partially opened tubular member to a horizontally reciprocal hopper assembly that includes gripper means to supportingly hold the tubular member and a spout vertically movable to open the tubular member, and saddle and pusher means to receivingly support the filled tubular member released by the hopper assembly and move it to another conveyor assembly.

---

This invention relates to apparatus for automatically carrying out a series of steps including severing a tubular member of given size from a continuous web; conveying the severed tubular member and, while being conveyed, transferring the severed tubular member to a traveling carriage assembly having a spout; discharging a weighed charge into the tubular member while it is at least in part being supported by said assembly at a dump location; and thereafter transferring the filled tubular member to a separate conveyor assembly.

One of the objects of this invention is to provide new and novel apparatus for automatically severing a tubular member from a continuous web, transferring the severed web onto a traveling carriage having a spout, completing the opening of the mouth of the tubular member to receive product as said assembly is traveling, filling the tubular member with product, and transferring the filled tubular member onto a separate conveyor assembly. Another object of this invention is to carry out the above object and at the same time providing an increased time interval for filling the tubular member while at the same time carrying out other of the above mentioned operations preparatory to transferring a second tubular member to said traveling carriage assembly.

An additional object of this invention is to provide new and novel apparatus for receiving flat tubular web material and frictionally holding said web material to depend therefrom while conveying it generally horizontally. A further object of this invention is to provide new and novel apparatus for slitting the leading and trailing edges at the upper end portion of a tubular member while it is being conveyed; next automatically transferring the thus slitted tubular member to a traveling carriage; and then while the carriage is traveling spreading the mouth portion of said tubular member preparatory to dumping a charge of product therein.

Still another object of this invention is to provide a new and novel traveling carriage for automatically gripping upper leading and trailing edge portions of a tubular member as it is being conveyed, and opening the mouth of the tubular member as it is being conveyed while the gripped portions move more closely adjacent one another. Another object of this invention is to provide a new and novel conveyor assembly having linear inner run portions for conveyingly supporting a tubular member; and automatically pivotally spreading said inner run portions after the tubular member has been automatically gripped and just prior to spout jaws moving into the mouth of said gripped tubular member.

A still further object of this invention is to provide a new and novel pusher assembly having transversely spaced pusher plates to have a generally flat vertical tubular member moved therebetween as the pusher assembly is moved in one direction relative said flat tubular member, and after the tubular member has been filled, move the filled tubular member in the same direction the flat tubular member was being moved. Another object of this invention is to provide new and novel saddle apparatus for automatically moving upward to elevate a filled tubular member as it is being grippingly held at its upper portions at a given elevation. In furtherance of the last two mentioned objects, it is a further object of this invention to automatically release the grippingly holding of the upper portions of the tubular member after it has been filled, to provide automatically operated swinging guides to move to supportingly slidably retain the tubular member in an upright condition as it is released, and to operate the pusher assembly to move the released, filled tubular member off the saddle assembly while the saddle assembly is in its upper position.

Other and further objects are those inherent in the invention herein illustrated, described and claimed, and will become apparent as the description proceeds.

To the accomplishment of the aforegoing and related ends, this invention then comprises the features hereinafter fully described and particularly pointed out in the claims, the following description setting forth in detail, certain illustrative embodiments of the invention, these being indicative, however, of but a few of the various ways in which the principles of the invention may be employed.

The invention is illustrated in the drawings in which the same numerals refer to corresponding parts and in which:

FIGURE 1 is a right hand side view of the apparatus of this invention, said view being taken between about the 250°–280° position of a cycle of operation of the main cam shaft wherein a tubular member has been severed from the web and conveyed a short distance rearwardly, the traveling carriage assembly is in a dump position and the saddle is near its uppermost position;

FIGURE 2 is a left hand side view of the apparatus of FIGURE 1 in approximately 150°–220° of a cycle of operation of the main cam shaft wherein the saddle assembly is in its lower dwell position, and web has been fed down but has not been conveyed by the block carrier chain;

FIGURE 3 is a somewhat enlarged fragmentary cross sectional view of the chain conveyor and knife severing assembly, and the web pusher assembly with portions of said view including the guide funnel being broken away, said view being generally taken along the line and in the direction of arrows 3—3 of FIGURES 1 and 4;

FIGURE 4 is an enlarged transverse cross sectional view of the structure of FIGURE 3 and additionally showing a portion of the web fed assembly after the knife has severed a tubular member and the pusher member has been retracted, said view being generally taken along the line and in the direction of the arrows 4—4 of FIGURE 3;

FIGURE 5 is an enlarged fragmentary view generally taken along the line and in the direction of arrows 5—5 of FIGURE 4 to more clearly illustrate the web carrying blocks of the conveyor and severing assembly and the mounting of said blocks;

FIGURE 6 is a somewhat enlarged vertical elevational view of the drive end portion (rearward end portion) of the conveyor and severing assembly, said view being generally taken along the line in the direction of arrows 6—6 of FIGURES 3 and 4;

FIGURE 7 is a somewhat enlarged, fragmentary, horizontal view showing the drive end portion of the conveyor and severing assembly, and part of the intermediate conveyor assembly, said view being generally taken along the line and in the direction of the arrows 7—7 of FIGURE 8 and showing the spread apart condition of the swing arms in dotted lines;

FIGURE 8 is a fragmentary vertical elevational view generally taken along the line and in the direction of arrows 8—8 of FIGURE 7, said view additionally showing the slitter assembly;

FIGURE 9 is a perspective view looking in the downward rearward direction toward the right hand side of the machine to more clearly illustrate most of the structure shown in FIGURES 7 and 8, and additionally to show more of the drive mechanism for the driven structure of FIGURES 7 and 8;

FIGURE 10 is a longitudinal, fragmentary, vertical view of the portion of the drive mechanism for the intermediate conveyor assembly and the conveyor and severing assembly, said view looking toward the right hand side of the machine;

FIGURE 11 is a somewhat enlarged fragmentary right hand side view of the rearward portion of the machine which shows the traveling carriage assembly adjacent the position to pick up an unfilled bag and the bag pusher assembly in a position that it has partially pushed a filled bag off the saddle, said view has been taken at about the 350°–360° cyclic position of the main cam shaft;

FIGURE 12 is a fragmentary enlarged perspective view of the left hand corner portion of the machine with the traveling carriage assembly in about the position illustrated in FIGURE 1;

FIGURE 13 is an enlarged, fragmentary rear end view showing portions of the traveling carriage assembly and structure for operating the bag pusher and saddle assemblies;

FIGURE 14 is a fragmentary enlarged perspective view looking in an upward direction toward the front of the machine between about the 85° and 230° cyclic position of an operating cycle of the main cam shaft;

FIGURE 15 is a fragmentary left hand side view of the traveling carriage assembly in a spout raised-closed condition, said view being generally taken along the line and in the direction of the arrows 15—15 of FIGURE 16;

FIGURE 16 is a front end view of the structure shown in FIGURE 15, said view being generally taken along the line in the direction of arrows 16—16 of FIGURE 15 and in dotted lines indicating two different positions of a movable jaw of the spout;

FIGURE 17 is a fragmentary, somewhat diagrammatic, transverse cross-sectional view looking toward the rear end of the machine to show the main cam drive mechanism of the apparatus of this invention;

FIGURE 18 is an enlarged, fragmentary, transverse cross-sectional view generally taken along the line and in the direction of the arrows 18—18 of FIGURE 11 showing the relationship of the spout to the swing arms and the swing arm assembly retaining the slit upper sidewall edge portions of the tubular member in a spread apart, generally horizontally extending position;

FIGURE 19 is a fragmentary, transverse, cross-sectional view taken a short interval of time after FIGURE 18 showing the tubular member being held by the gripper feet, the swing arms in a partially spread apart condition, and the spout jaws just after they have dropped sufficiently to enter between the upper sidewall portions of the tubular member;

FIGURE 20 is a schematic, somewhat simplified, pneumatic and electric circuit diagram, generally showing the electrical circuitry in solid lines and the pneumatic circuitry in dotted lines other than the internal fluid connection of the solenoid operated air valves in one condition are shown in solid lines and in a second condition in dotted lines, there also being diagrammatically shown certain of the related mechanical components including portions of the structure for intermittently driving the pinch rolls; and FIGURE 21 is a sequence chart showing the sequence of operation of various assemblies and components of the machine that are controlled by cams.

Referring now in particular to FIGURES 1, 2 and 8, the apparatus of this invention includes a frame 20, and an intermittently driven feed assembly 21 for feeding flattened tubular continuous web material, a conveyor and severing assembly 22 for receiving web material from assembly 21 and thereafter severing a tubular portion of the material from the web, a web pusher assembly 23 that cooperates with assembly 22 for moving the web material to a position that a tubular portion of the web material is severed and conveyed by assembly 22, an intermediate conveyor assembly 24 for receiving the severed tubular portion from assembly 22 and conveying the tubular portion for subsequent operations; a slitter device 25 for slitting the upper leading edge and trailing edge portions of the tubular member and folding the slitted opposite upper wall portions transversely outwardly from one another; a traveling carriage assembly 26 for receiving the tubular member from the intermediate conveyor assembly, then opening the tubular member while it is being conveyed and dumping a weight charge into tubular member; a saddle assembly 28 acting in conjunction with assembly 26 for supporting the tubular member as it is being filled; a bag pusher assembly 27 for moving the filled tubular member to another operation; and drive mechanism 29 for operating each of the assemblies 21, 22, 24, 26, 27 and 28 in timed sequence with each of the other aforementioned assemblies. The main frame 20 includes a longitudinally elongated, generally box-type frame having transversely spaced front uprights 31, intermediate uprights 32, a second set of intermediate uprights 33, and rear uprights 34. The uprights on the right side of the frame are connected by top horizontal frame member 35 while uprights 31–33 on the left side of the frame are connected by a top frame member 36. A transversely central upright 33 and the rear upright 34 on the left side of the frame are connected by a top frame member 37.

Uprights 31 mount a transversely extending plate 39 while uprights 32 mount a corresponding plate 40 (see FIGURES 1, 2, 3 and 4). Plates 39 and 40 rotatably mount longitudinally elongated pinch rolls 42, 43 for rotation about longitudinally extending axes, said pinch rolls cooperating with one another for intermittently feeding web material 44 downwardly into and through the guide funnel 45. The guide funnel extends between plates 39 and 40 and is pivotally connected thereto at 46 to have its inlet directly beneath rolls 42, 43. Mounting brackets 47, 48 are respectively dependently secured to plates 39, 40, a stop bar 49 being mounted on brackets 47, 48 to limit the pivotal movement of guide funnel 49 in direction opposite arrow 50 about pivot members 46.

The web material, which preferably is film-type such as polyethylene in flattened tubular form and is directed through pinch rolls 42, 43, is supplied from a roll of web material 44a supported on a shaft 56 that is mounted via left hand uprights 31, 32. The web material from supply roll 44a is fed up over an idler roll 57, next through suitable feeding and tensioning mechanism (not shown) and thence through the entry nip of pinch rolls 42, 43. The feeding and tensioning mechanism and the pinch rolls are intermittently driven and controlled by suitable drive linkage gear and control mechanism driven from a cam 322 keyed on main cam shaft 53 (see FIGURES 2 and 17), the drive linkages, gear, control, feeding and tensioning mechanism being diagrammatically depicted by dotted lines 54 and dotted line box 55 in FIGURES 1, 2 and 4 and in part diagrammatically shown in FIGURE 20. Since this drive linkage, gear and control mechanism does not form a part of this invention, other than for the sequencing controls, it has been only partially diagrammatically shown.

As may be noted from FIGURE 4, the outlet opening of the funnel 45 is located at about the same elevation as the conveyor and severing assembly 22 and the web pusher assembly 23, and is located transversely intermediate said assemblies when the pusher assembly is in the retracted position of said figure. The conveyor and severing assembly includes longitudinally elongated angle brackets 59, 60, the angle bracket 59 being dependently secured to mounting brackets 47, 48 and the angle bracket 60 being mounted beneath bracket 59 and spaced therefrom by suitable spacer members (not shown). The angle brackets at their rearward end (see FIGURES 6 and 7) rotatably mount a first vertical shaft 62 and a second shaft 63. A block chain sprocket 64 is keyed to shaft 62 while an enlarged diameter block chain sprocket 65 is journaled for rotation on shaft 63. Referring to FIGURE 4, at the forward ends of the angle brackets 59, 60 a shaft 68 rotatably mounts a block chain sprocket 66, a link chain 67 being extended around sprockets 64, 66 with intermediate run portions in engagement with sprocket 65.

Link chains 67 mount a plurality of blocks 70 that are generally U-shaped in vertical cross section such that the blocks carried by the linear inner run of the chain have leg portions located vertically intermediate the vertical flanges 59a, 60a of the angle brackets 59, 60 (see FIGURES 4, 5 and 7). That is, the blocks on the inner run of the chain have channels opening toward the web pusher assembly 23. Referring in particular to FIGURE 7, a longitudinally elongated back-up bar 71 is mounted on bracket 60 between sprockets 65, 66 to prevent any substantial transverse movement of the linear inner run of chain 67 toward the outer run. Likewise, a backup bar 72 is muonted on bracket 59 to prevent a substantial transverse movement of the linear inner run of chain 73 toward its outer run, chain 73 being extended around a sprocket 74 that is keyed to shaft 63 (see FIGURES 3, 4, 6 and 7) and a sprocket 75 that is rotatably mounted on shaft 68 to be rotatably independent of sprocket 66 that is located therebeneath. A bar 76 is mounted on bracket 60 closely adjacent the linear inner run portion of the block chain, but on the opposite side of said inner run portion from the backup bar 71 whereby bar 76 prevents a substantial transverse movement of said inner run toward the web pusher assembly.

Chain 73 carries a knife blade 80 (see FIGURE 4) such that as the knife blade is moved by the chain linear inner run between sprockets 75 and 74; the knife blade extends between the vertical flanges 59a, 60a of brackets 59, 60, and transversely outwardly thereof to be located more closely adjacent the web pusher assembly 23 than said brackets. Further, the path of travel of the knife blade along the linear inner run is vertically above the blocks 70 that are carried by the linear inner run of the block chain 67.

Referring in particular to FIGURES 3 and 4, the web pusher assembly 23 includes a pair of longitudinally spaced cylinders 82 that are respectively fixedly attached to mounting brackets 47, 48 which in turn are dependingly secured to brackets 39, 40, respectively. Each cylinder includes a piston rod 83 connected respectively to the adjacent longitudinal end of the pusher member 84. The pusher member has a longitudinally elongated pusher tongue 84a that is at an elevation vertically intermediate the vertically spaced legs of the blocks 70, the tongue in the pusher assembly retracted position of FIGURE 4 extending substantially more closely adjacent the conveyor and severing assembly 22 than any other part of the pusher assembly. The pusher assembly also includes a horizontal elongated resilient pad 84b that extends more closely adjacent the assembly 22 than any other portion of the web pusher assembly, except for tongue 84a. As may be noted from FIGURE 4, the pad is located at a higher elevation than the tongue 84a and the lowermost portion of the vertical flange 59a of bracket 59. When the piston cylinder combinations 82, 83 are moved to their extended condition, the pusher member moves the tongue whereby the tongue forces the adjacent portion of the film into the channel provided by the horizontal legs of the blocks 70 on the linear inner run portions of the block carrier chain.

Referring now in particular to FIGURES 7 and 8, the apparatus of this invention includes a pair of longitudinally extending, transversely spaced plates 86, 87 that are mounted such that the forward end portion of plate 87 extends beneath angle bracket 60 and plate 86 in part extends beneath the rearward portion of the pusher member in its extended condition. The rearward portions of the plates 86, 87 are respectively connected to plates 88, 89 by spacer members 90 to be located therebeneath. Plates 88 and 89 are transversely spaced and have their rear end portions mounted on the lower portion of casting 91 to extend forwardly thereof. The rear portion of plate 92 is bolted to the top portion of casting 91 to extend forwardly thereof and in overhanging relationship to plates 88, 89. The forward end portion of plate 92 rotatably mounts the upper ends of vertical shafts 93 and 94 in transverse spaced relationship, the lower end of shaft 94 being rotatably mounted by the forward end portion of plate 89 and the lower end of shaft 93 being rotatably mounted by plate 88. A pair of gears 95 are respectively keyed on shaft 93, 94 in intermeshing relationship so that when one of the shafts is driven, the other shaft will be drivenly rotated in an opposite direction.

Each of the shafts 93, 94 has a pulley sheave 96 keyed thereto at an elevation between plates 88, 89 and 87, 86. A belt 99 is extended around pulley sheave 96 on shaft 93 and a pulley sheave 101 journaled for rotation on the forward end of plate 86. A belt 100 likewise is extended around the other pulley sheave 96 and a pulley sheave 101 that is journaled for rotation on a forward end of plate 87.

The belts 99, 100 are accordingly mounted to form an entry nip longitudinally adjacent and vertically beneath the rearward end portion of the linear inner run of block carrier chain (adjacent sprocket 65). Accordingly, as the block carrier chain moves a severed tubular member into the aforementioned nip, the tubular member is removed from the blocks and thence carried rearwardly by said belts, it being noted that there are provided a plurality of longitudinally spaced rollers 102 on each of the plates 86, 87 for retaining the inner runs of belts 99, 100 closely adjacent one another.

Belts 99, 100 convey the tubular member into the entry nip formed by belts 104 and 105, belt 104 being extended around a pulley sheave 106 that is keyed to shaft 93 (see FIGURES 1 and 14) and a pulley sheave 102 that is rotatably mounted on the rearward end portion of swing arm 107 in depending relation thereto. Likewise belt 105 is extended around a pulley sheave 106 keyed to shaft 94 and a pulley sheave 103 rotatably mounted on the rearward end portion of swing arm 108 (see FIGURES 2 and 14).

Intermediate portions of the inner and outer runs of belt 105 are in abutting relationship with the enlarged diametric pulley 111 that is rotatably mounted on a left hand vertical swing shaft 113, opposite end portions of shaft 113 being secured in and extending between upper and lower horizontally projecting portions of casting 91 such as shown in FIGURE 8. The casting likewise mounts a second shaft 113 transversely spaced from the first mentioned shaft 113, an enlarged diametric pulley being rotatably mounted on the second shaft 113 to be in abutting relationship with the intermediate portions of the inner and outer runs of belts 104. Each of the swing shafts has a gear 114 mounted for rotation relative thereto.

The left hand shaft 113 rotatably mounts an annular mounting member 116 intermediate the rearwardly horizontally projecting portions of casting 91 while the right hand shaft likewise rotatably mounts an annular mounting member 115. Mounting member 116 has a flange portion bolted at 117 to gear 114 that is on shaft 113 while mounting member 115 likewise has a flange portion bolted to second gear 114 on the right hand shaft 113. The aforementioned gears 114 are mounted in intermeshing relationship whereby when one of the annular mounting members is angularly moved in one direction, the other annular mounting member is moved a corresponding amount in the opposite angular direction. Mounting member 116 has a forward end portion of swing arm 108 welded thereto while mounting member 115 has a forward end portion of swing arm 107 welded thereto. A generally transversely extending control arm 120 has one end welded to mounting member 115 and extends transversely above swing arm 108. By pivoting arm 120 in a direction of the arrow 119 about the axis of the right hand shaft 113, through gears 114, the swing arms are moved from their solid line positions of FIGURE 7 to the spread apart dotted line positions illustrated thereon. A coil spring 109 has an end connected to each arm 107, 108 for resiliently urging said arm to the solid line condition of FIGURE 7. To be noted is that even in the swing arm dotted line position of FIGURE 7, the inner and outer runs of belts 104, 105 bear against their respective pulley sheaves 111; while in the solid line position of the swing arms, the inner runs of said belts extend generally linearly in abutting relationship throughout substantially the entire length between pulley sheaves 106 and pulley sheaves 102, 103 when no tubular member is between said runs. A plurality of rollers 118 are dependingly mounted on each of arms 107, 108 to hold the inner runs of belts 104, 105 in abutting relationship on the swing arms when they are in solid line position of FIG. 7. Further, said rollers retain linear inner portions of belts 104, 105 that extend between sheaves 111, 111 and 102, 103 respectively more closely adjacent one another than the adjacent, generally longitudinal edges of arms 107, 108.

Referring to FIGURES 8 and 9, the slitter knife assemly 25 is mounted on the casting 91, the slitter knife assembly including a longitudinally elongated support bracket 110 having one end portion secured to a horizontally and vertically central portion of the casting. A transversely extending bolt and nut 121 is mounted on support member 110, nut and bolt 121 mounting a knife mounting block 122 directly above the inner runs of belts 104, 105. Block 122 in turn mounts a generally vertical knife blade 123 for slitting the upper portion of the leading and trailing edges of the tubular member that extend above belts 104, 105 as said tubular member is conveyed therepast by belts 104 and 105. After the leading edge is slitted, the slitted upper wall portions of the tubular member are spread apart by the knife blade and laid generally horizontally over the inner runs of belts by the block 122 to extend outwardly from one another, and are retained at a generally horizontal condition by the guide plate 124. The guide plate and belts 104, 105 pass through a downwardly opening notch (not shown) in the casting 91. Since the slitter knife assembly including the guide bar 124 is more fully described in copending application Ser. No. 432,106, filed Feb. 12, 1965, said application being assigned the same assignee as this application, the structure and operation of the slitter knife assembly will not be described in greater detail in this application. However, it is to be noted that guide plate 124 which is mounted by casting 91 retains the slit, laid open horizontal edge portions of the tubular member in a generally horizontal condition until they pass beneath the bottom horizontal surfaces of the swing arms 107, 108 to be retained thereby in a generally horizontal condition such as shown in FIGURE 18.

A pair of guide rollers 125 are respectively rotatably mounted on plates 88 and 89 for retaining the inner runs of belts 104, 105 in abutting relationship with the knife blade 123 extended into the exit nip formed by said rollers just above said inner runs. Also belt guides 126 are respectively mounted on plates 88, 89 transversely adjacent guide plate 124 for retaining the adjacent inner run portions of belts 104, 105 in abutting relationship except when a tubular member is conveyed therebetween.

Referring now in particular to FIGURES 1, 2, 9, 11, 12 and 13, the traveling carriage assembly 26 will now be described. The traveling carriage assembly includes a pair of transversely spaced, longitudinally extending travel rods 127, each travel rod being secured to the intermediate transverse frame member 129 by a clamp 128. The frame member 129 at opposite ends is secured to uprights 34. The forward end portion of each rod 127 extends through and is mounted by the lower end portion of a vertically elongated bracket 130, each bracket 130 in turn being dependently secured to the upper transverse frame member 132 which at opposite ends is joined to frame members 35 and 36. Also as may be noted from FIGURE 9, the forward end portions of rods 127 are extended through horizontal apertures in the upper portion of casting 91 to supportingly mount said casting.

Referring now in particular to FIGURES 11, 15 and 16, the assembly 26 includes a carriage frame having an open, generally rectangular vertical carriage frame portion transversely outwardly of each of the travel rods 127, each of said carriage frame portions including a top frame member 134, a bottom frame member 135, a front frame member 136 and a rear frame member 137 which are joined together. Frame members 136, 137 are vertically elongated and parallel to one another. The upper end portions of the frame members 136 are connected together by transverse frame member 138 while the upper end portions of rear frame members 137 are connected together by rear transverse frame member 139 (see FIGURE 13). Thus frame members 134, 138, 139 and the members to which they are joined form a generally horizontally open rectangular frame portion. Lower reinforcing bar 131 connects the frame members 136, 136.

A transversely inwardly extending stud shaft 140 is bolted to the mid portion of each of frame members 136 while a transverse shaft 141 is extended between and is bolted to members 137. On the shaft 140, 141 adjacent each of the frame members 136, 136, 137, 137 there is rotatably mounted a wheel 142 to ride on adjacent portion of the respective travel bar 127. On the vertical opposite side of the travel bars from each of the wheels 142, a hold down roller 143 is mounted on the adjacent vertical frame member.

Referring in particular to the FIGURES 14, 14 and 16, on the shaft 141 there is pivotally mounted an annular member 144 to each end portion of member 144 there is welded a radially extending arm 145, each arm 145 at its opposite end being pivotally connected to the adjacent end portion of a transverse rod 146 which at each end is mounted to the lower end of an ear 147 (also see FIGURE 15). Each ear 147 at its opposite end is integrally joined to a boss 148, bosses 148 being integrally joined to opposite ends of a casting portion 149. An upwardly and somewhat transversely outwardly projecting ear 150 is also integrally joined to each boss 148, members 147–150 advantageously being a single casting. Generally longitudinally extending links 153 at their one ends are connected to the respective ear 150 by a transverse pivot member 154, the opposite end of each link being connected to adjacent frame member 137 by transverse pivot member 155. As may be noted in FIGURE 15, arm 145 and links 153 are mounted so that they are maintained in parallel relationship to one another.

Each boss 148 pivotally mounts one end of a longitudinally extending, horizontal rod 158. The opposite ends of the rods 158 are connected together by a transverse bar 159, the rod 158 being pivotally extended through their respective end portion of bar 159.

A pair of transversely spaced, longitudinally extending angle irons 160 at their rearward ends are attached to frame member 138 (see FIGURE 13) while each angle iron at the forward end is secured to a tabe 161 which in turn is dependently secured to frame member 138. The angle irons are welded to adjacent vertical surfaces of the generally rectangular portion 163f of the spout 163 whereby portion 163g is stationary relative the carriage frame. Portion 163g has a parametric upper horizontal flange 163f at an elevation above the carriage frame member 139 and depends from angle irons 160 to substantially lower elevation as shown in FIGURE 15. The spout also includes a first and a second spout jaw, each spout jaw having a sidewall 163a attached to the adjacent rod 158 to pivot with the rod about its axis between the closed solid line position of FIGURE 16 and the open position of FIGURE 14. Each of the spout jaws is the same size and shape except one is a right hand jaw and the other is a left hand jaw. Thus each spout jaw includes a substantially planar, generally rectangular sidewall 163a and a generally trapezoidal end wall 163b having an edge integrally joined to the sidewall, a second edge inclined to extend upward at an acute angle to the sidewall, a third edge inclined a few degrees from being parallel with the sidewall, and a fourth edge extending at substantially right angles to the sidewalls. Each jaw also includes a second end wall 163c that is the same size and shape as sidewall 163b other than for the integrally formed triangular projection 163d. The second inclined edge of each end wall 163b is cut at an angle to form a close fit with the wall 163a of the opposite jaw when the jaws are in a closed condition, the lower edges of sidewalls 163a being beveled to form a close fit in a jaw closed position. The triangular portions 163d are provided to in part overlap end walls 163b in a jaw opened condition which is partially illustrated in FIGURE 14. Also, each of the triangular portions 163d in a jaw opened condition have a lower edge extending generally horizontally and which is located at a lower elevation then the top marginal edge of the tubular member that is to be filled by the spout.

In order to move the spout jaws between an opened and a closed condition, one end portion of a clamp bracket 167 is clampingly mounted on the forward end portion of the left hand rod 158 while the opposite end of said bracket is pivotally connected to the lower end of the piston rod 168 by a horizontal pivot member 169. The piston rod is operated between a retracted condition of FIGURES 15 and 16 and a lower extended condition by a cylinder 172, the upper end of the cylinder being pivotally connected by a pivot member 173 to a bracket 174. The lower end of the bracket 174 is bolted to the transverse midportion of frame member 138.

One end of a connector link 170 is pivotally connected by pivot member 171 to the clamp bracket 167 between left hand rod 158 and pivot member 169 and vertically above a straight line drawn between the pivot axes of said members 158, 169. The opposite end of link 170 is pivotally connected via pivot member 171 to one end of a pivot arm clamp 174, the opposite end of clamp 174 being clamped on the forward end of the right hand rod 158. As may be noted from FIGURE 16, pivot member 169 is located transversely and vertically intermediate the two pivot members 171 while pivot members 171 are located more closely adjacent pivot member 169 than rods 158. Accordingly, when the piston rod is moved to its extended condition, clamp bracket 167 and clamp arm 174 are moved in opposite angular directions the same angular amount and thereby pivot the rods 158 in opposite angular directions to move the spout jaws to the spread apart condition of FIGURE 14. However, the initial extending movement of the piston rod towards its extended position does not cause spread apart movement of the jaws as will become apparent hereinafter.

To be noted at this time is that the support for the spout jaws is provided by horizontal rods 158, said rods in turn being movable in a vertical direction only when the casting 147–150 is moved. The casting in turn is mounted on the one end of the parallel links 145, 143 for arcuate swinging movement about the axes of parallel transverse members 141, 155; and is retained in the uppermost vertical condition of FIGURES 15, 16 by the connection of the piston rod 168 to the rods 158 as previously described. This casting is constantly resiliently urged in a downward direction through the provision of coil spring 175 which has one end connected to rod 146 and the opposite end to the forward reinforcing rod 131. However, spring 175 cannot move rod 146 and thereby casting 147–150 in a generally downward direction unless the piston rod 168 is likewise moved. Upon applying air to the upper end of the cylinder 172, the piston rod 168 is moved in a downward direction thereby permitting the coil spring 175 to move casting 147–150 and rod 146 downwardly the same amount. As a result of the coil spring, the initial downward movement of the piston rod does not result in any turning force being applied to clamp bracket 167 and clamp arm 174.

In order to obtain opening of spout jaws at the desired elevation, each of the casting ears 150 is provided with an offset into which there is threaded a stop bolt 177 to depend therefrom. Each stop bolt overlies a horizontal surface of the stop abutment 178 that is welded to the respective frame member 136. As a result of providing members 177, 178 during the movement of the piston rod to its extended condition, the casting is likewise moved downwardly a corresponding amount due to the resilient urging of spring 175 until the stop bolts 177 abut against abutments 178. At this time further downward movement to the casting 147–150 is prevented, and thus upon further extending movement of the piston rod, clamp bracket 167 is pivoted about the axis of its rod 158 and clamp arm is pivoted in the opposite direction about the axis of its rod 158 whereby the jaws are moved from the lower closed position (dotted line position X for the left hand jaw) to their spread apart opened condition (dotted line position Y for the left hand jaw). When the piston rod is retracted, the opposite sequence of the movement of the jaws relative one another and the casting 147–150 relative reinforcing rod 131 takes place.

Referring now in particular to FIGURES 11, 12, 14, 16 and 19, the bag gripper subassembly, which is mounted on the carriage frame for movement relative thereto and therewith, will now be described. The tubular member gripper subassembly includes an elongated rod 182 for each of the left hand frame members 136, 137, the upper end of front rod 182 being keyed to one end of a transverse pivot member 183, and the rear rod 182 being keyed to one end of a pivot member 193. Pivot member 183 is pivotally mounted by frame members 136, while rod 193 is likewise mounted by frame members 137. The lower end of each rod 182 mounts a transversely, inwardly extending angle bracket 184. Each angle bracket 184 fixedly mounts a cylinder 185 of a piston-cylinder combination that includes a transversely movable piston rod 186. The inner transverse end of each piston rod has a gripper foot 194 that is transversely opposite a gripper foot 189 on the inner end of a transverse rod 190. The opposite end of each rod 190 is mounted on bracket 191 which in turn is secured to the lower end of a rod 192. The upper end front rod 192 is keyed to the end of the pivot member 183 opposite the front rod 182 while rear rod 192 is keyed to the opposite end of rod 193. A bar 195 is secured to each rod 182 to extend in a radially opposite direction from pivot 183 than the direction of elongation of the respective rod. A coil spring 196 has one end connected to the rear bar 195 and an opposite end to the front bar 195 to resiliently urge the lower ends of front rods 182, 192 to pivot longitudinally forwardly of the carriage frame and rear rods 182, 192 to pivot longitudinally rearwardly of said carriage frame, the amount of pivotal movement being limited by an adjustment screw 197 being threaded through each bar 195 to abut against the adjacent flange of the respective frame member 136, 137 such as shown in FIGURE 12. Due to the provision of the coil spring 196, the front piston cylinder combination 185, 186 and foot gripper rod 190 and foot 189 are pivotable longitudinally rearwardly about the pivot axis of pivot 183 against the resilient action of spring 196 while the rearward members 185, 186, 190, 189 are pivotable longitudinally forwardly about the pivot axis of pivot member 193.

Referring to FIGURES 15 and 16, to each of the frame members 135 there is dependingly secured a bag holder jaw housing 198 that extends transversely inward toward the other housing 198. Each housing mounts a longitudinally elongated bag holder jaw 199 that is of a length at least as great as the longitudinal length of the spout jaw planar wall 163a. Each jaw has a resilient pad 199a at an elevation to have the adjacent spout jaw in position Y abut thereagainst, and a sensing switch 199b to actuate controls described hereinafter.

For supporting and guiding the top portion of the filled bag as it is moved rearwardly by the apparatus of this invention, there is provided a guide tube assembly that includes a pair of longitudinally elongated guide rods 203 (see FIGURES 1, 11, 12 and 14). The guide rods are mounted and are of a length to extend longitudinally from a short distance forwardly of frame member 129, with the guide rods adjacent one another, vertically beneath the rearward ends of the swing arms in a swing arm closed condition. That is, each guide rod has a rearward end welded to the inner transverse edge of an angle bracket 204, each bracket in turn being bolted to the lower end of the mounting arm 205. The upper end portion of each arm is welded to an annular member 206 that is pivotally mounted on the respective travel rod 127 (also see FIGURE 13) in fixed longitudinal relationship relative thereto, a radially extending arm 207 also being welded to each of said annular members. For each arm 207 there is provided a linkage 210 that at one end portion is loosely pivotally connected to a pivot member 213 secured to said arm and at the opposite end portion, has a loose pivot connection with pivot member 214 mounted on radial arm 211. The radial arms are welded to opposite end portions of a tubular member 215 which is rotatably mounted on a rod 216. Each end of the rod 216 is mounted by a bracket 217, the brackets being secured to the uprights 34 (see FIGURES 11 and 12).

The tubular member 215 on each of its end portions mounts a radially extending arm 220 that extends outwardly thereof in a direction generally diametrically opposite extension of arms 211. Arms 220 support the saddle assembly 28. As may be noted from FIGURES 1, 2 and 11 the saddle assembly includes a vertically extending support rod 221 for each arm 220 that is pivotally attached to the respective arm by a transverse pivot member 222. Each support rod has a longitudinally extending block 223 attached to its lower end to move therewith. Each end portion of each block dependingly mounts a guide rod 224 for movement therewith, each guide rod being movably extended between a pair of transversely spaced rollers of a guide roller member 225. A pair of longitudinally spaced guide roller members 225 is mounted on a bottom longitudinal frame member 226 that extends between the uprights 33, 34 on the left side of the machine while a second pair of guide roller members are likewise mounted on frame member 226 that extends between the corresponding uprights on the opposite side of the machine.

On each guide rod there is mounted for selected vertical adjustment relative the guide rod, a transversely inwardly extending saddle bracket 227, the inner end portions of the saddle brackets on one side of the machine being bolted to one inclined wall 228a of the generally V-shaped saddle 228 and the inner portion of the other pair of saddle brackets being bolted to the other inclined wall of said saddle. As may be noted from FIGURES 1 and 2, saddle 228 is longitudinally elongated to have one end portion located beneath the rearward ends of the swing arms 107, 108 and an opposite end portion extending longitudinally rearwardly of the rearward most portion of the carriage frame in its rearward most position.

Referring to FIGURES 1, 2, 11 and 14, the bag pusher assembly 27 on each transverse side of the machine includes longitudinally extending rods 230, 231 that are mounted parallel to one another just transversely inwardly of the rods 221, 224 on the respective side of the machine. A transversely inwardly extending mount 232 secured to the midportion of the upright 33 and a corresponding transverse mount 233 is secured to the upright 34 for mountingly supporting the rods 230, 231 on the right hand side of the machine vertically spaced and in aforementioned relationship. Likewise, there is provided a transversely extending mount 232, 233 on the opposite side of the machine for supportingly mounting rods 230, 231 on said side, the mount 232 being secured to the midportion of transversely intermediate upright 33. On each side of the machine there is provided a carrier plate 240, a pair of rollers 241 being mounted on each carrier plate to roll on the adjacent rod 230 and a pair of hold down rollers 242 being mounted on the respective plate on the opposite side of the respective rod 230 from the adjacent roller 241. Each carrier plate also mounts a roller 243 to roll on the adjacent rod 231. Accordingly, the carrier plates are retained on rods 230, 231 for only longitudinal movement between the position shown in FIGURE 1 and a position closely adjacent transverse mount 233.

To each carrier plate there is bolted a vertically elongated angle bracket 245 that has a flange extending transversely toward the other carrier plate. A transverse leg of a pusher plate 246, that is somewhat J-shaped in horizontal cross section is bolted to the right hand angle bracket while a corresponding leg of a pusher plate 247 is bolted to the left hand angle bracket. Each pusher plate has a longitudinally curved leg 246b, 247b, respectively, that extends forwardly of the respective transverse leg, the curved legs being transversely spaced from one another and curved to diverge in a forward direction to facilitate the entry therebetween of the lower portion of the empty tubular member being carried by the swing arms when the carrier plates are being moved toward a location longitudinally adjacent the swing arms. Further, the lower portion of each pusher plate transverse leg is provided with a cut out 248 so that the transverse leg inner end portion and the curved leg extends to a lower elevation than the uppermost edge adjacent inclined walls 228a of the saddle and transversely inwardly of the inclined walls upper edges.

As may be noted from FIGURES 1, 2, 4, 9, 14 and 17, there are provided guide panels 253, 255, guide panel 255 being located on the left hand side of the path of travel of the tubular member and guide panel 253 being on the right hand side of the path of the tubular member. Guide panel 255 has an upper inclined portion 255a that is inclined upwardly and transversely toward the left of the machine throughout its longitudinal length, panel 255 extending from a position just forwardly of the trailing edge of unsevered web as it depends from the pinch rolls to a position longitudinally adjacent the rearward end of the swing arms. The rearward end of the panel 253 is located transversely opposite the rearward end of panel 255 while the forward end extends a short distance forwardly of the leading edge of the unsevered web as it is dependingly fed between the pinch rolls. Further panel 253 at the forward end is more remotely transversely spaced from the path of travel of the severed tubular member than its rearward end. Each panel has a transversely outwardly extending flange 253c, 255c that is at a slightly lower elevation than plates 86, 87 (see FIGURE 9). Guide panel 253 is secured to the transverse inner end portions of a plurality of braces 256, 254 which at the opposite ends are bolted to uprights 32 and 33 respectively while panel 255 is attached to upright braces 257 that in turn are secured to frame members 270, 280 (see FIGURE 17). The guide panels serve to maintain a tubular member in a generally vertically extending flat condition until just prior to the time the tubular member has been moved to a position that product is discharged thereinto, the saddle being provided with a cut out (not shown) to have the rear edge portions extend rearwardly of the front portion of the saddle.

Referring in particular to FIGURES 2 and 17, the drive mechanism 29 includes a motor 260 drivenly connected to a reducer 261 through a pulley-sheave combination 262, the motor reducer being mounted on a plate 263 that is bolted to bottom transverse frame members 264 respectively extending between uprights 31, 31 and longitudinal frame members 265 that respectively extend between each set of uprights 32, 33. The reducer output shaft has a sprocket 259 keyed thereto for driving a chain 266 that is extended around a sprocket 267 that is keyed to a transverse main cam shaft 53. The cam shaft is rotatably mounted by a plate 268 that is secured to the left hand frame member 265 and at the opposite end by a plate 269 that at its lower end is attached to a longitudinal frame member 270 which in turn at opposite ends is supported by a frame member 264 and a transverse frame member (not shown) extending between the right hand and intermediate uprights 33.

Keyed to the cam shaft is a sprocket 275 which drives a chain 274, chain 274 in turn driving a sprocket 277 that is keyed to the input shaft of the angle gear drive member 276 (see FIGURE 10). The angle gear drive member is mounted on a plate 278 which in turn is mounted on intermediate transverse frame member 279, frame member 279 at one end being secured to intermediate frame member 280 and at the opposite end to the left hand upright 32. The output shaft 276a of the member 276 through a coupling 283 drives the vertical jack shaft 284. The upper end of the jack shaft is rotatably mounted by a mounting member 300 which in turn is mounted by frame member 301 extending between frame members 35, 36 (see FIGURE 2). A large sprocket 287 is keyed to the jack shaft for driving a chain 288 which in turn drives a sprocket 289 that is keyed to the lower end of shaft 63 (also see FIGURES 6 and 9). Through the aforementioned structure, the shaft 63 is constantly driven to constantly drive the knife chain sprocket 74 that is keyed thereto, but not to drive the sprocket 65 which is rotatably independent of shaft 63.

An air clutch 295 is mounted on the jack shaft 284, and only intermittently drives sprocket 299 which is mounted thereon. That is, even though shaft 284 is constantly rotating, sprocket 299 is only intermittently rotated due to the air clutch 295. Since the air clutch 295 is a conventional stock item, sold under the name Horton "Air Clamp" Clutch, model FW, by Horton Manufacturing Company of Minneapolis, Minn., its structure will not be described in detail. Sprocket 299, even though on the jack shaft, is rotatable independent of the jack shaft to intermittently drive chain 296 which in turn drives sprocket 297 that is keyed to the upper end of shaft 62 (see FIGURES 6, 9 and 10). Since sprocket 297 is intermittently driven, accordingly through shaft 62, sprocket 64 intermittently drives the block carrier chain in timed relationship to the movement of the knife chain as will be more apparent hereinafter.

Keyed to shaft 284 is a sprocket 305 that drives chain 306, chain 306 driving a sprocket 307 that is keyed to shaft 94 (see FIGURES 7–10). By the aforementioned structure, shaft 94 is constantly driven in one direction while due to the provision of gears 95, shaft 93 is driven in the opposite direction of the shaft 94. Accordingly belts 104 and 105 and 99, 100 have their inner runs constantly driven in the same direction. Preferably belts 99, 100, 104, 105 and pulley sheaves 106, 96 are timing belts and timing belt sheaves.

Referring back to FIGURE 17, a swing arm cam 310 is keyed to cam shaft 53, there being provided a cam follower on the lower end of cam arm 311 that rides in a cam track (not shown) of the cam 310. The opposite end of the cam arm is keyed to a pivot shaft 312 for pivoting said shaft in accordance with the shape of the cam track of cam 310. One end of the transverse pivot shaft 312 is pivotally mounted by plate 269 while the opposite end is pivotally mounted by a plate 313 attached to frame member 314 extending between the left hand uprights 32, 33. Keyed to shaft 312 and extending radially thereabove is an arm 314, the upper end of the arm 314 being pivotally connected to linkage 315 by a ball joint pivot member 316 that is secured to the upper end of said arm (see FIGURES 2 and 9). The opposite end of linkage 315 is pivotally connected to the hooked end of bracket 120 by a ball joint pivot member 317. Accordingly, as arm 314 is pivoted, for example, in the direction of arrow 320 (FIGURE 9) about the axis of shaft 312, the swing arm bracket 120 is pivoted about the axis of right hand shaft 113 in the direction of the arrow 119 (see FIGURE 7) whereby swing arm 107 is pivoted about the last mentioned axis toward the dotted line position of FIGURE 7 and swing arm 108 pivoted in the direction of the arrow 321 to move it toward its dotted line position due to the provision of gears 114.

A carriage cam 324 having a cam track 324a is keyed to cam shaft 53 to through a cam follower 325a extended into track 324a and mounted on the carriage arm 325 pivot the carriage arm about shaft 326, the lower end portion of the carriage arm being mounted on shaft 326 but rotatable relative thereto. Shaft 326 at its opposite ends is pivotally supported by shaft mounts 327, the left hand shaft mounting being secured to frame member 328 that is joined to frame member 264 of FIGURE 17 and another transverse frame member (not shown). The other shaft mount is secured to a frame member 329 that extends between frame member 264 and another said frame member (not shown). The upper end of carriage arm 325 is pivotally connected to one end of a connector rod 331 by a pivot member 332, the opposite end of the connector rod being pivotally connected by a pivot member 333 to a block 334 that is secured to the left hand frame member 136 (see FIGURE 12). Accordingly, as arm 325 is pivoted in the direction of arrow 336 about the pivot of its axis of shaft 326, the carriage and structure mounted thereon is moved longitudinally forwardly in the direction of arrow 337 from the position of FIGURE 2 to the position of FIGURE 11.

A bag pusher cam arm 342 has its lower end welded to one end of an annular member 339 that is pivotally mounted on shaft 326, arm 342 having an intermediate portion mounting a cam follower 341 that extends into a cam track (not shown) of a bag pusher cam 340 that is keyed to cam shaft 53 (see FIGURE 17). Referring in particular to FIGURES 2 and 14, the upper end of arm 342 is connected by a pivot member 343 to the forward end of a connector rod link 344, the opposite end of link 344 being loosely pivotally connected to the inner transverse end of a pivot member 345. The opposite end of pivot member 345 in turn is mounted by left carrier plate 240.

As may be noted from FIGURE 17, the annular mount 339 and shaft 326 extend beneath the guide panels 253, 255, the lower end of a second bag pusher arm 349 being fixedly attached to annular member 339 to rotate therewith and being located on the opposite sides of the guide panels from arm 342. Referring to FIGURES 1 and 11, the upper end of arm 349 is pivotally connected to connector rod link 344 by a pivot member 355, the opposite end of said link being loosely pivotally connected to a pivot member 350 that extends transversely outwardly to have its opposite end fixedly attached to the right hand carrier plate 240 (left side as viewed in FIGURE 14).

The pusher arms 342, 349 are the same length and extend in the same angular direction from annular mount 339. As the pusher arm 342 is caused to pivot about the pivot axis of shaft 326 in a direction opposite of arrow 336 by the cam follower 341 being moved by cam 340, arm 349 likewise is pivoted in a direction opposite arrow 336. Pivoting arms 342, 349 in a direction opposite arrow 336 results in both carrier plates moving their respective pusher plates 246, 247 in the direction of arrow 351 from a position illustrated in FIGURE 1 to a position that a filled bag on a saddle 228 is completely pushed off the saddle.

For selectively elevating and lowering the saddle and swinging the bag top guide rods 203 between a relatively closely adjacent position and a more remote spread apart condition, there is provided a saddle operating arm 356 that has its lower end welded to an annular member 357 (see FIGURES 2 and 17). The annular member is mounted on pivot shaft 312 and is pivotable relative said shaft independent of the movement thereof. One end of a control arm 358 is welded to annular member 357, the outer end portion of said arm 358 mounting a cam follower that extends into the cam track of a saddle cam 359 that is keyed to cam shaft 53.

Referring to FIGURE 2, the upper end of arm 356 mounts a pivot member 360 that provides a pivot connection with one end of the control rod linkage 361, the opposite end of said linkage being pivotally connected by a pivot member 362 to the outer end of an arm 363 which is welded to annular mount 215 to extend radially relative thereto in an angular direction about 90° relative the directions of extension of arms 211 and 220 respectively relative to said mount (also see FIGURES 11, 12 and 13). As arm 358 is caused to pivot in the direction of arrow 367 about the axis of shaft 312 due to the cam follower riding in the track of cam 359, annular mount 215 is pivoted in the direction of arrow 365 (FIGURE 12) to through arms 200 move the saddle assembly 28 upwardly (arrow 369) from the position of FIGURE 2 to a position at a slightly higher elevation than that of FIGURE 1. The saddle in its uppermost position is at an elevation that a filled bag on the saddle and pushed horizontally rearwardly is moved onto a separate V-trough conveyor assembly 370 which does not form a part of the apparatus of this invention. However, it will be mentioned that the conveyor 370 carries the filled bag through subsequent operations, such as a sewing or a heat sealing operation to form a bag top closure on the filled bag.

At the same time the saddle assembly is being moved in a generally upward direction, the annular mount in pivoting in the direction of the arrow 365 moves links 210 downwardly to pivot the right hand member 206 (left side of FIGURE 13) in the direction of arrow 372 and the left hand member 206 in the opposite direction (arrow 373) whereby the bag top guide rods 203 are moved from the spread apart position shown in FIGURE 14 to a nearly abutting position at the time the saddle assembly is in its uppermost position. Overhanging longitudinally adjacent portions of the saddle and conveyor 370 are a pair of longitudinally elongated, transversely spaced guide bars 374. Brackets 375 secured to frame member 129 (see FIGURE 12) mount said bars to extend closely adjacent the rearward ends of guide rods 203 in their nearly abutting position.

In order to supply the proper charge of product being dumped through the spout, there is provided a overhanging scale hopper 378 having a bottom parametric flange 378a and which may be mounted on frame 20 by suitable structure (not shown). The flange 378a is inclined in a rearward downward direction to facilitate the movement of the parametric flange 163f of the spout portion 163g therebeneath in a close fitting engagement therewith. That is, with the carriage assembly in its rearward most position (FIGURES 1 and 2), flange 378a forms a close fit with flange 163f to minimize escape of product that is dumped from the scale hopper to the spout.

An annular member 380 is mounted on shaft 312 for pivotal movement relative thereto, said member mounting a radial cam arm 381 having a cam follower extended into the cam track (not shown) of the cam 322 that is keyed to cam shaft 53. A second radial arm 382 is secured to member 380 to extend about right angles relative thereto in a forward direction, arm 382 being connected through appropriate linkage (represented by dotted line 54) to a segment gear 383 mounted on plate 40 (see diagrammatic representation on FIGURE 20) to pivot said segment gear first in one direction and then in the opposite direction about a longitudinal axis as cam shaft 53 is rotated through 360°. The segment gear forms part of the intermittent drive mechanism 55 and is mounted in intermeshing relationship with a gear 384 on one end of a longitudinal shaft 385, shaft 385 being journaled for rotation by plates 39, 40. The opposite end of the shaft mounts a oneway drive air clutch 386 for driving gear 387 in only one direction even though shaft 385 is first rotated in one direction and then in the opposite direction. Clutch 386 is sold under the name of "Air Champ," model LW, by Horton Manufacturing Company, Inc., of Minneapolis, Minn. Gear 387 is mounted in intermeshing relationship with a gear 388 that is keyed to one end of the shaft of pinch roller 42, gear 388 also being mounted in intermeshing relationship with a gear 389 that is keyed to one end of the shaft of pinch roller 43. Accordingly, as gear 387 drives gear 388 in one direction, gear 389 is driven in the opposite direction. An air brake 390 is provided adjacent the opposite end of the shaft of pinch roller 42 for selectively braking said shaft, said brake being attached to plate 40. The aforementioned air brake is also sold under the name "Air Champ" by Horton Manufacturing Company, Inc.

Still referring to FIGURE 20, the electrical and pneumatic circuit and components will now be described. The electrical circuitry includes main lines $L_1$ and $L_2$, each having a plurality of junctions thereon. A cam switch member 395, a stop switch 396, and a relay 397 are connected in series across lines $L_1$ and a first terminal 399 of a selector switch 413. Cam switch member 395 is a part of a conventional multicam timer that includes a cam member 394 having a cylindrical cam surface other than for an indentation whereby switch member 395 riding on the cylindrical surface is retained in a closed condition, but is resiliently urged (by spring means not shown) to fall into said indentation and thereupon move to an open condition.

Connected in series between terminal 399 and junction 400 is a multicam timer switch member 401 and a second terminal 403 of the selector switch. Switch member 401 is operated between an opened and closed position by the cam member 402 of the multicam timer. Junction 400 is connected to junction 406 via line 405, starter 407 being connected between junction 406 and line $L_2$. Upon energizing starter 407, motor 260 is energized and starter relay 397 is moved to a closed condition while de-energizing the starter de-energizes said motor and operates relay 397 to an opened condition.

Connected in series between junctions 406 and main line $L_1$ is a normally open start switch 410 and a spout height check switch 411. Switch 411 is mounted on the right hand upright 136 and has a switch operator in overhanging relationship to parallel link 153 (see FIG- URE 11). Switch 411 is a normally opened switch that is moved to a closed position by link 153 being moved to a spout up position and is resiliently moved to an opened position upon said link being pivoted downwardly from said position.

A junction 408 intermediate the series connection of switch member 395 and switch 396 is connected by a line 412 to a junction 409 intermediate the series connection of switch member 411 and switch 410.

The selector switch includes a third terminal 424 that is connected to junction 414, and a switch member 415 that is movable to connected terminal 399 to terminal 424, or alternately to terminal 403. A relay 416 is connected across junctions 414, 417, junction 417 being connected to junction 400 via line 418. Also connected across junctions 414, 417, is an eye override switch member 419. A second eye override switch member 420 is connected between main line $L_1$ and junction 422, switch members 419, 420 being part of a common switch simultaneously operated by operating member 421 wherein switch member 419 is normally closed and switch member 420 is normally opened. Switch operating member 421 is located above arm 382 to during the uppermost portion of pivotal movement of arm 382 in a direction opposite to arrow 423, move switch member 419 to an opened condition and switch member 420 to a closed condition and retained them in such condition only until arm 382 is sufficiently pivotally moved in the direction of arrow 423.

Connected across junction 422 and main line $L_2$ is a solenoid coil 426 of the solenoid operated, tube clamp-air clutch control valve 427. Valve 427 also has a second solenoid coil 428 which is connected across main line $L_2$ and junction 425.

Valve 427 has an inlet port 429 that is continuously connected to a source of pressurized air (not shown), a second port 430 continuously connected to an exhaust (not shown), a third port 431 and a fourth port 432. Through a solenoid operated valve member (not shown), in one valve member position, port 430 is fluidly connected to port 431, and port 429 fluidly connected to port 432; but in a second valve member position, the aforementioned fluid connections are broken and fluid connections are made between ports 430 and 432, and 429 and 431, respectively. A line 433 fluidly connects port 431 to the one end of the cylinders 82; while the opposite end of said cylinders are fluidly connected to port 432 via line 434. Line 434 also connects port 432 to air clutch 295.

A solenoid operated, air brake-air clutch valve, generally designated 440, is provided, valve 440 being of the same construction as valve 427. Valve 440 includes inlet port 441, an exhaust port 442, a third port 443 and a fourth port 444. A solenoid operated member (not shown) in one position fluidly connects ports 441, 444 and 442, 443, respectively; and in a second position breaks the aforementioned connections and fluidly connects port 442 to port 444, and port 441 to port 443. Port 443 is connected by a line 445 to the oneway drive air clutch 386 whereby applying air under pressure through line 445, through internal structure (not shown) of the clutch, gear 387 is driven; but with no air under pressure applied thereto, gear 387 is not driven. That is, when no air under pressure is applied to clutch 386, in part due to the inertia from gears 388, 389, gear 387 remains stationary even though shaft 385 is being rotated.

A line 446 fluidly connects port 444 to the air brake 390 whereby applying air under pressure to the air brake, through internal brake structure (not shown), the shaft of pinch roll 42 is prevented from being rotated. However, upon discontinuance of the application of air under pressure to brake 390, the pinch roll is drivably rotatable.

Valve 440 has a solenoid coil 449 that at one end is connected to main line $L_2$ and at the opposite end is connected in series through a magazine on-off switch 450 and a cam switch member 451 to main line $L_1$. Switch 450 is a manually operated on-off switch which in an off position results in no web being fed by the pinch rolls; while cam switch member 451 is part of the multicam timer and is operated between an opened and closed position by cam member 452 of said timer.

Control valve 440 also includes a second solenoid coil 455 which is connected across main line $L_2$ and junction 456, junction 456 in turn being connected by a line 457 to junction 422. A relay 458 is connected across junction 456 and main line $L_1$.

As previously indicated, each of valves 427, 440 are of the same construction and are operated in the same manner. Referring to valve 427, for example, when the solenoid coil 428 is energized, the valve member (not shown) of valve 427 is moved to position to respectively connect port 430 to port 431, and port 429 to port 432; while for valve 440 the solid line fluid connection of FIGURE 20 are made when coil 455 is energized. To be noted is that only one of the solenoid coils 428 and 426 is energized at any given period of time, and that the internal fluid connections remain the same upon the de-energization of the respective solenoid coil until the other solenoid coil of the same valve is energized.

A line 460 connects main line $L_1$ and junction 461, a light source 462 being connected between junctions 461 and 463. Junction 463 is connected to main line $L_2$ by line 464. Assuming the web material is transparent, light source 462 is provided for directing a beam of light through the web portion 44b to photocell unit 465 prior to the time said web portion is fed to the pinch rolls. In order to use the machine with transparent web material, or alternately with opaque web material, a second light source (not shown) would be connected to junction 463 and a selector switch having a terminal connected to junction 461 would be provided for selectively electrically connecting light source 462 across junctions 461, 463, or said second light source across said junctions. The second light source would be at a location to reflect light off the web to photocell unit 465.

Photocell unit 465 is of a construction to operate relays 416, 458 between their opened and closed conditions, and when said unit is de-energized, said relays are retained in an opened condition. When the photocell unit is energized but no light is received thereby from source 462, relays 416, 458 are retained in a closed condition. However, with unit 465 energized and it receiving light from source 462, it operates relays 416, 458 to their respective opened conditions. Noted that the web is provided with spaced black indicia 469. Adjacent indicia are spaced from one another by a distance of the length of tubular member to be severed from the web and are located in a position to be moved between light source 462 and unit 465 for blocking the beam of light to unit 465 as web portion 44b is moved therebetween.

The photocell unit is connected across junctions 463, 470, there being provided an eye cutout switch 471 that is connected across junction 461, 470 and resiliently retained in an open condition by a spring (not shown). Switch 471 is operated to a closed condition and retained therein at an appropriate time interval during the pivotal movement of arm 382. That is switch 471 is retained in a closed condition during an uppermost portion of pivotal movement of arm 382. Assuming that there were printing on the web intermediate adjacent indicia 469, arm 382 would be in angular positions that switch member 471 would be in an opened condition and retained in said condition during the interval that the printing was moving between light source 462 and unit 465; but arm 382 would move to operate switch member 471 to a closed condition after said printing had passed and prior to the interval that the next indicia 469 is to be moved into the path of the light beam from source 462. For example, arm 382 would retain switch member 471 closed during 135°–165° angular movement of cam shaft 53.

In order to control the transverse movement of the bag

19 top gripper feet 194, i.e., the application of air under pressure to the respective ends of cylinders 185, 185, there is provided a solenoid operated, gripper control valve 476 that has an inlet port 477 connected to a source of air under pressure, an exhaust port 478, a third port 479, and a fourth port 480. An internal valve member (not shown) in a solenoid coil energized position fluidly connects port 477 to port 480, and port 478 to port 479; but upon de-energization, automatically moves to break the aforementioned connections and fluidly connect port 478 to port 480 and port 477 to port 479.

Line 482 is connected to the one end of the cylinders 185 and to port 480 so that when air under pressure is applied through port 480, the piston rods 186 are moved to their extended condition of FIGURE 19. The opposite ends of said cylinders are connected by line 483 to port 479.

A second solenoid operated air valve, generally designated 486 and of the same construction as valve 476, has an inlet port 487 that is connected to a source of air under pressure (not shown), an exhaust port 488, a third port 489, and a fourth port 490. Through an internal valve member (not shown), when the solenoid coil 493 of valve 486 is energized, port 487 is connected to port 490 and port 488 is connected to port 489; but when said solenoid coil is de-energized, the aforementioned connections are broken and port 487 is connected to port 489, and port 488 to port 490. A line 491 connects port 490 to the upper end of the spout jaw raising cylinder 172, and a line 492 connects port 489 to the lower end of said cylinder. Upon applying air under pressure through port 489 to cylinder 172, piston rod 168 is elevated to raise the jaws; while upon applying air under pressure through port 490, the piston rod is lowered.

Valve 486 includes solenoid coil 493 which is connected in series with cam switch member 495, said switch member and coil being connected between main lines $L_1$ and $L_2$. Cam switch member 495 is operated between an opened and a closed condition by a cam 496 of the multicam timer. The multicam timer also includes a cam member 499 for operating cam switch member 500 between an opened and a closed condition, switch member 500 and solenoid coil 501 of valve member 476 being connected in series across main lines $L_1$ and $L_2$.

The multicam timer also includes a cam member 505 for operating a switch member 504 from closed condition to open condition. Each of the cam members 505, 496, 499, 452, 402, and 394 are mounted on a single shaft represented by dotted line 506, have cam surfaces and indentations of appropriate angular dimensions, and have their respective indentations located in proper angular positions to operate their respective switch members to a closed condition (or opened condition) in accordance with the description set forth hereinafter. Also, each cam switch member is resiliently retained in engagement with the cylindrical cam surface of the respective cam member until the cam member indentation moved beneath the switch member and then the switch members 452, 499, 496 and 395 are resiliently urged to an opened condition (likewise members 402, 504 to a closed condition) by a spring (not shown) and retained in said condition until the respective indentation moves angularly past the switch member.

The cam shaft of the multicam timer is operatively connected to a shaft 507 rotatably mounted on a control panel 508. Shaft 507 has a sprocket 509 that is driven by a chain 510 which in turn is driven by a sprocket 511 keyed on the cam shaft 53 (see FIGURE 20) so that shaft 507 is rotated 360° for each 360° revolution of shaft 53. Also mounted on shaft 507 is a radially extending arm 512 that in rotating beneath switch member 513 moves the switch member to a close condition for a short interval of sufficient duration to have coil 428 move the valve member of valve 427 to make the solid line fluid connections of FIGURE 20, said switch member being resiliently urged to an opened condition by a spring

20

(not shown). Switch member 513 is connected across junction 425 and main line $L_1$.

A scale switch 516 of scale hopper 378, switch member 504, switch members 199b, and a scale dump solenoid 517 are connected in series with one another and across other convention scale controls 518. To be noted is that the scale switch is of the type that closes when the scale has come to a predetermined weight, and that the scale dump solenoid 517 is energized after its scale switch 516 has closed and each of switch member 393, 520, 504, 199b, 199b have been also closed. The scale controls 518 and scale on-off switch 520 are connected in series across main lines $L_1$ and $L_2$, the scale being inoperative until switch 520 is manually moved to a closed condition.

The structure of the apparatus of this invention having been described, the operation thereof will now be set forth. Initially, referring to FIGURE 21, it is to be noted that at the left of said figure there is set forth the respective assembly that is controlled by a main cam on the cam shaft 53 and at the right the respective cam, i.e., cams 324, 340, 359, 310 and 322. Each of these cams has a cam track of a shape that through the previously described cam followers and linkages, the movement depicted on the sequence chart will be imparted to the assembly controlled by the respective cam. Additionally, it is to be noted that from the time that the web is fed by the pinch rolls to initially begin its downward movement from the elevation of terminal edge 44c as shown in FIGURE 4 until the time that the tubular member formed from the web that has the illustrated terminal edge and said tubular member has been filled and pushed onto the conveyor assembly 370, the cam shaft 53 is rotated approximately 1180°. Thus after the machine has been initially started to feed web downwardly between the pinch rolls and cam shaft 53 rotated through 1180° from the initial downwardly feeding of the web, at any given interval of time there is more than one tubular member being processed through the machine. Accordingly, in order to facilitate the description of the operation of the machine, the description will now proceed from the point of time 15° in advance of the time that a tubular member integrally formed as part of continuous web 44 is initially being fed down from the elevation of 44c in FIGURE 4 until said tubular member has been severed from the web, filled and pushed onto the separate conveyor assembly 370.

Also for purposes of facilitating the description of operation, it will be assumed the machine is to be started from a preceding day's operation wherein no severed tubular member was left in the machine, cam shaft 53 is stopped in the 265° angular position of the sequence chart of FIGURE 20, and the unsevered web is left extended from supply roll 44a along a stretch 44b that is passing between the light source 462 and the photocell unit 465 and thence extends over pinch roll 42 downwardly between the pinch rolls 42, 43 to have lower terminal horizontal edge 44c at an elevation just above the knife 80. At this time one of the indicia 469 (right one in FIGURE 20) is slightly past (in the direction of arrow 529) the beam of light from the light source to the photocell unit. Further the cam members of the multicam timer are in positions that switch member 395 is closed and switch members 401, 451, 495, 500 and 504 are open. Also at this time arm 382 is in a position that eye override switch 471 is open, switch member 419 is closed and switch member 420 is open. Further valves 427, 440 have the solid line fluid connections of FIGURE 20. As a result, upon applying air under pressure to the inlet ports of valves 427, 440, air under pressure is applied through line 446 to the air brake 390 to prevent rotation of the pinch rolls 42, 43, to the ends of cylinders 82, so that the piston rods 83 and web pusher member 84 are in a retracted condition, and to air clutch 295 so that when the motor is energized the block carrier chain will be driven. However, air clutch 386 is connected to exhaust port 442 and accordingly, even if shaft 385 were being driven, pinch rolls 42, 43 would not be driven.

Now with switch members 450 and 520 closed, and the selector switch 413 in a position that switch member 415 electrically connects terminals 399, 424, switch 393 is closed. This energizes light source 462 to transmit a beam of light to photocell unit 465, but relays 458, 416 remain open since no indicia 469 interrupts said beam of light, and also since switch 471 is open. This closing of switch 393 also energizes coil 428 since arm 512 is in an angular position to hold switch 513 closed, but the valve member of valve 427 remains in the solid line fluid connection condition of FIGURE 20.

Also, at this time the starter relay 397 is in an opened condition, and accordingly motor 260 has not been energized. Further, the spout jaws are up since switch member 495 is open and the coil 493 of control valve 486 is not energized but air under pressure is being applied to port 487. Also, the cam shaft 506 of the multicam timer is in position that switch 395 is now being retained in a closed position. Accordingly, upon momentarily moving the normally open start switch 410 to a closed position, starter 407 is energized to thereby energize motor 260 and to operate relay 397 to a closed condition. With relay 397 in a closed condition, the starter remains energized even though the manual pressure on switch 410 is released whereby it moves to an opened condition.

Initial rotation of cam shaft 53 from energizing motor 260 results in arm 512 moving such that switch members 513 open to de-energize coil 428 and in arm 382 moving through angular positions whereby override switch member 471 remains in an open condition so that even if there is printed on web portion 44b intermediate indicia 469 to interrupt the light beam directed at unit 465, unit 465 cannot operate relays 416, 458 to closed positions. Upon rotating cam shaft 53 to about its 280° angular position (first cycle), multicam timer cam member 452 is angularly moved to close switch member 451 to energize solenoid coil 449 whereby the valve member of valve 440 makes the dotted line fluid connections of FIGURE 20 to connect the air brake 390 to exhaust port 442 and apply air under pressure through line 445 to one way drive clutch 386 to impart one way driving movement to gear 387 to through gears 388, 389 rotate pinch rolls 42, 43 to feed web downwardly to a lower elevation than that illustrated at 44c. The movement of the block carrier chain (due to air under pressure being applied to clutch 295) does not interfere with this downward feeding of the web since after severing of the tubular member that was previously joined to the terminal edge 44c of FIGURE 4, the guide funnel 45 had pivoted in a direction opposite arrow 50 whereby the web now being fed downwardly is to the right of the block carrier chain as illustrated in FIGURE 4.

Now through about the 280° angular position of the cam shaft of its first cycle of revolution, the 360° angular position and to about the 150° angular position of the second cycle, the pinch rolls continue to feed the web downwardly therebetween. At about the 150° angular position (second cycle), the second indicia 469 (left one of FIGURE 20) is moved sufficiently to the right to be adjacent the beam of light from light source 462. However, prior to this time, but after the pinch rolls have started feeding the web downwardly, arm member 382 has been moved in the direction opposite arrow 423 to an angular position that the photo cell cutout switch 471 has moved to a closed condition to energize unit 465; and thus, upon the left hand indicia 469 of FIGURE 20 moving into the path of a beam of light of the then energized photocell unit, said unit is actuated to move relays 458 and 416 to a closed condition, retain said relays in a closed condition for a period of for example 60° of angular movement of cam shaft 53, and then move said relays to an open condition. It is noted that at this time the solenoid coil 428 and solenoid coil 449 are de-energized due to corresponding movement of arm 512 and cam member 452. The closing of relay 458 operates valve 440 to connect the one way drive clutch 386 to exhaust port 442 and apply air under pressure to brake 390 whereupon pinch rolls 42, 43 are positively stopped. At the time the pinch rolls are stopped, web of sufficient length has been fed downwardly beneath the elevation of knife 80 that a tubular member of the desired length will be severed from the web.

During the time interval between left indicia 469 of FIGURE 20 initially interrupting said light beam and the stopping of the pinch rolls, the pinch rolls have drawn the web sufficiently in the direction of arrow 529 that said left indicia 469 is moved out of the beam of light and unit 465 is operated so that relays 416, 458, after a time delay, will move to an open condition. During the time interval relays 416, 458 are closed (or normally should be closed), and at about the 150° angular position (second cycle), arm 382 through operator 421 moves switch member 419 to an open condition and switch member 420 closed for about 5° angular movement of cam shaft 53 whereby, if there had been no said left indicia 469 to interrupt the beam of light, starter 407 would be de-energized and solenoid coil 455 energized to respectively stop motor 260 and the feeding of the web by the pinch rolls even though relays 416, 458 had not closed.

At the same time that the pinch rolls 42, 43 are being stopped, due to relay 458 being in a closed condition or if relay 458 is not closed, due to the closing of switch member 420, solenoid coil 426 is energized whereupon air clutch 295 is connected to exhaust port 430 and accordingly does not apply driving movement to sprocket 299. The block carrying chain thereupon stops very quickly through inertia. Also due to energizing coil 426, air under pressure is applied through port 431 to cylinders 82 to move the pusher member 84 to the left of that illustrated in FIGURE 4. When the pusher member 84 is moved to the left, tongue 84a initially contacts the web vertically below funnel 45; and upon contacting the depending web, moves the web and thereby the funnel so that the funnel pivots in the direction of arrow 50. Further, this movement of the pusher member results in the tongue 84a moving into the channels of the blocks on the inner runs of chains 67 to reversely bend the web such as illustrated for tubular member 51 in FIGURE 4 other than the web is continuous from the lowermost elevation of FIGURE 1, through the pinch rolls, portion 44b and back to the supply roll on shaft 56. That is during the 150°–170° angular positions of cam shaft (second cycle) the pusher member is moved to reverse bend said web and clamp the unsevered tube against flange leg 59a.

From prior to the time that tongue 84a initially engages the web until after the tongue has reversely bent the unsevered web into the channels of the blocks on the linear inner run portion of the block carrier chain and pad 84b clamps the adjacent web portion against flange leg 59a, the knife chain 73 is carrying knife 80 through the portion of path of travel remote from the unsevered web 44. However, after the unsevered web has been reversely bent into the block channels and clamped against leg 59a, knife 80 is moved by and along the linear inner run of chain 73 to cut the web 44 at an elevation vertically above the block chain to form a severed tubular member 51. It is to be noted that the unsevered web 44 at an elevation just above the knife 80 has a bottom closure seam extending longitudinally across its width while the severed tubular member 51 has a corresponding bottom closure seam 51d at its lower end. Thus, during the 170°–220° angular positions of cam shaft 53 (second cycle), the continuous web 44 is severed by knife 80 to form a tubular member 51.

At the cam shaft 265° position (second cycle), shaft 507 has moved arm 512 to a position to close switch 513 and retains it in a closed position for a sufficient interval to energize coil 428 to operate the valve member of valve 427 to the solid line fluid connections of FIGURE 20, and thence allows switch 513 to open, it being noted arm 512 can be selectively angularly positioned to vary the time of closing switch 513 between about the cam shaft 250°–278° position for the subsequent centering of the tubular member on the spout. As a result of energizing coil 428, piston-cylinder combinations 82, 83 are operated to retract the pusher member, the horizontal legs of the blocks frictionally holding the reversely bent web portion of the severed tube so that the retraction of tongue 84a does not result in severed member 51 falling from the block carrier chain. Just after tongue 84a has been moved out of engagement with the severed tubular member, air under pressure is applied to air clutch 295 whereby sprocket 299 is driven and accordingly the block carrier chain driven to move the severed tubular member in the direction of arrow 351. The block carrier chain conveys tubular member 51 into the entry nip between belts 99, 100 which engagingly abut against the tubular member at an elevation below the reversely bent portion of the web. As the tubular member is moved rearwardly of the entry nip between belts 99, 100 the reversely bent portion of the tubular member is pulled out of the vertically adjacent block and straightens so that there is no longer any reversely bent portion.

Also, just after tongue 84a moving out of abutting engagement with the severed tubular member 51, the cam timer has moved its cam member 452 to a position that switch 451 moves to a closed condition to energize coil 449, for a period to move the valve member of valve 440 to the dotted line fluid connection condition of FIGURE 20 and then allows switch member 451 to move to an open condition. The energizing of coil 449 results in air brake 390 being connected to exhaust port 442 and air under pressure applied to clutch 386 whereby at the cam shaft 280° position (second cycle) gear 387 through gears 388, 389 drives the pinch rolls 42, 43 to begin feeding said web downwardly below the elevation of the path of travel of knife 80 in a manner previously described.

Belts 99, 100 carry the severed web into the entry nip of belts 104, 105 wherein belts 104, 105 abut against opposite sidewall portions of tubular member at an elevation about belts 99, 100, but below the top marginal edges thereof. The leading edge of the tubular member that extends above belts 104, 105 is moved to be slitted by knife 123 and thence the top sidewall portions of the tubular member are spread apart in opposite transverse directions and held in the generally horizontal condition by the knife mounting block 122 and guide 124 as the tubular member is conveyed in the direction of arrow 351 rearwardly of the knife. At the time the leading edge of the tubular member is initially conveyed rearwardly of the shafts 113, the swing arms are in the solid line condition of FIGURES 7 and 18 wherein the portions of the inner runs of belts 104, 105 transversely adjacent the swing arms are held in abutting condition. As shown in FIGURE 18, one transversely extending sidewall portion 51d is then vertically intermediate the belt 105 and arm 108 while the opposite transversely extending sidewall portion 51e is located vertically intermediate arm 107 and belt 104. Accordingly, during about main cam shaft 265° position (second cycle) to the 150° position (third cycle), the block chain belt is conveying the severed tubular member; while from about the 85° position (third cycle) to about the 10° position (fourth cycle), belts 104, 105 are carrying the tubular member, the swing arms during the last mentioned interval being in the closed solid line condition of FIGURE 7. Note that about the main cam shaft 150° position (third cycle) solenoid coils 426, 455 are again energized in the manner previously described.

During the 280°–360° (third cycle) movement of cam shaft 53, the traveling carriage assembly is being returned to pick up the tubular member presently being conveyed by belts 104, 105. During the return movement of the carriage assembly toward the FIGURE 1 position (arrow 357), but prior to the time the spout has moved vertically adjacent the swing arms, the indentation of cam member 394 moves under switch member 395 whereby said switch member moves to an opened condition. However, under normal operating conditions, switch member 411 has already been moved to a closed condition by linkage 153, due to the spout jaws being elevated through cylinder 172, and during the interval switch member 395 is opened, switch member 411 is closed. Accordingly, starter 407 remains energized. In the event the spout jaws have not been elevated, then switch member 411 is opened, and upon opening switch member 395, the starter would have been deenergized to prevent further forward movement of the carriage assembly wherein the spout jaw would be at an elevation to strike the swing arms.

At about the 0° position of the fourth cycle of cam shaft 53, the carriage assembly is at its maximum forward position of FIGURE 11 and thence immediately begins its rearward movement. Between about the main cam shaft 0°–10° positions (fourth cycle), cam 499 has rotated to the position to move switch member 500 to a closed condition, this energizing solenoid coil 501 and thereby applying air under pressure through port 480 to the transverse outer ends of cylinders 185, 185. At about the cam shaft 10° position (fourth cycle) the carriage assembly has been accelerated to be traveling in a rearward direction (arrow 351) at the same rate as the linear runs of belts 104, 105 and has the spout jaws located directly above the mouth of the tubular member such as illustrated in FIGURE 18. At this time the cylinders 185, 185 have moved the piston rods 186 and feet 194 relative feet 189 at an elevation below belts 104, 105 to clamp the leading edge portion of the tubular member at a location that is longitudinally rearwardly of the spout jaws and the trailing edge portion at a location longitudinally forwardly of the spout jaws, the gripper feet clamping the tubular member in a longitudinal center condition relative the spout jaws.

Just after the gripper feet clamp the tubular member and between about the main cam shaft 10°–35° positions (fourth cycle), cam 310 starts to and does operate the swing arms to their maximum spread apart condition. After the swing arms have been partially spread apart, cam member 496 is rotated sufficiently to close switch member 495 to energize coil 493 and thereby apply air under pressure through port 490 to the upper end of cylinder 172. This results in the spout jaws being moved downwardly from the solid line FIGURE 16 position to the FIGURE 19 position wherein the jaws in a closed condition enter transversely between upper sidewall portions 51e, 51d; and thence downwardly to the X position of FIGURE 16 prior to any opening movement being imparted to the jaws. The spout jaws at their downward X position extend into the tubular member to a substantially lower elevation than the slits formed in the leading and trailing edges of the tubular member by the slitter knife 123, and then spread to be in a fully open condition (Y position) at the main cam shaft 60° position (fourth cycle). As may be noted from FIGURE 21, during the time the spout jaws have been moving downwardly, the swing arms have already moved to the maximum spread apart condition and dwell in said spread apart condition between the cam shaft 35°–60° positions of the fourth cycle.

During the interval of time that the spout jaws are being moved downwardly from the FIGURE 19 position to the X position of FIGURE 16 and thence spreading apart to the Y position, the sidewall portions of tubular member abutting against the planar walls 163a, 163a of the jaws are being further spread apart. In order to permit this spreading apart, and due to this spreading apart movement, the longitudinal distance between the trailing edge and leading edge of the tubular member is decreased. This decrease in longitudinal spacing transmits its force through the gripper feet whereby the front gripper feet 189, 194 pivot about the axis of pivot member 183 in the direction of arrow 525 (see FIGURE 12) while the rear gripper feet pivot about the axis of pivot member 193 in a direction of arrow 526 (see FIGURE 15). This pivotal movement of the front and rear gripper feet toward one another is opposed by spring 196 and accordingly the upper trailing edge portion is moved substantially the same distance toward the spout jaws as the upper leading edge portion during the time the jaws move into the tubular member and thence to the spread apart condition to open tubular member for dumping a charge thereinto. When the jaws are in the maximum spread apart condition, sidewalls 163a, 163a clamp the adjacent tubular member sidewall portions against adjacent pad 199a.

During about the 60°–80° positions of the cam shaft (fourth cycle), cam 310 moves the swing arms to the closed solid line condition of FIGURE 7, the carriage assembly having already moved the bag 51 longitudinally rearwardly of the belts 104, 105; and thence these belts are retained in said solid line condition until cam shaft 10° position of the next cycle.

At about the cam shaft 60° position (fourth cycle), the spout jaws have been moved relative pads 199a to a tubular clamping position and cam member 505 has moved to the position that switch member 504 closes. At the time the jaws are moved to said clamping position, each sidewall of the tubular member abuts against the adjacent switch member 199b to move said switch members to a closed condition. In this connection each spout jaw planar wall 163a has a cutout (not shown) into which the operating portion of the adjacent switch member 199b extends in the spout jaw bag wall clamping position such that if there is a bag sidewall portion being clamped between each respective jaw wall 163a and pad 199a, the respective switch 199b is moved to a closed condition by the bag sidewall. However, if no bag sidewall (or only one) is being thus clamped, both (or one) of the switch members remain in an open condition whereby the scale dump solenoid 517 cannot be energized, i.e., switches 199b being "no bag-no product" switches.

Prior to the time switch members 199b are closed, the desired charge of product has been discharged into scale hopper 378 and thus switch 516 is in a closed condition. At about the 60° position of cam shaft 53 (fourth cycle), cam 505 has moved to an angular position that switch member 504 is closed for a short time interval to provide an impulse to scale dump 517, and then switch 504 is moved to an open condition. The momentary energization of solenoid 517 results in the scale hopper gates (not shown) moving to an open condition, the scale hopper being of a construction that the gates thereof remain open until the weighed charge has passed therethrough and then automatically move to a closed condition. The gates remain in a closed condition until solenoid 517 is again momentarily energized. Thus upon the closing of all of switches 516, 199b, 199b and closing switch 504, the scale dump solenoid 517 is energized so that the product starts to descend from the scale hopper. However, product has not descended to an elevation of the spout jaws until after the carriage assembly has been moved to its rearward most dump position, i.e., at about the 80° position (fourth cycle) of cam shaft 53, wherein the relatively stationary part 163f, 163g of the spout is directly beneath the scale hopper 378. The spout remains in its rearwardmost position between the 80°–280° (fourth cycle) movement of cam shaft 53, during which time product is discharged through the spout into the tubular member that is being gripped by feet 189, 194.

Prior to the cam shaft 240° position of the fourth cycle, the desired quantity of product has already been discharged from the scale hopper and cam member 505 has already moved its indentation whereby switch 504 breaks the scale dump circuit. After the scale dump circuit has been broken and the weighed charge has been dumped into the bag but prior to the 240° position of the fourth cycle, cam member 496 has moved its indentation beneath switch member 495 to de-energize coil 493; and accordingly, air under pressure is then applied to the lower end of cylinder 172 at about the 240° position of the fourth cycle to move the spout jaws from the Y bag clamp position thence to the X position whereupon switches 199b open, and thence to their solid line "up" position of FIGURE 16. During the interval the spout jaws move from the Y position to the X position and subsequently to their "up" position, the front gripper feet are pivoted in the direction opposite arrow 525 (FIGURE 12) and the rear gripper in a direction opposite arrow 526 (FIGURE 15) due to spring 196 and the closing and the upward moving of the jaws thus result in the upper portion of the filled tubular member being moved to a closed condition.

During the fourth cycle while the carriage assembly is being moved forwardly to a dump position, the saddle assembly is moved downwardly (annular member 215 being pivoted in the direction of arrow 365 of FIGURE 12) and is located in its lowermost position at the time the carriage assembly stops at its dump position. At this time the bottom portion of the tubular member on the carriage assembly abuts against the saddle so that the saddle supports the tubular member as it is being filled. The saddle assembly remains in the lower dwell position until about the cam shaft 240° position (fourth cycle) and thence due to the shape of cam track of cam 359 is moved upwardly as the spout jaws are moved upwardly. At the time the saddle assembly is in its uppermost position, i.e. at the end of the dwell of carriage assembly in its dump position, guide rods 203 have been moved transversely toward one another to abut against opposite upper sidewall portions of the tubular member at an elevation above the level of product in said tubular member of the then closed bag top to retain the bag top in a closed condition. Also, cam member 499 has rotated so that switch member 500 is dropped into the cam members' indentation to thereby de-energize solenoid coil 501 and apply air under pressure through port 479 to cause cylinders 185 to at about the cam shaft 280° position (fourth cycle) retract their piston rods 186. As a result the gripper feet 194 are moved away from feet 189 so that the filled tubular member is no longer supportingly held by the carriage assembly but rather is only supportingly held in an upright condition by the saddle while guide rods 203 only hold bag top in a closed condition but permit longitudinal movement of the bag top relative thereto.

At the same time that the gripper feet release the tubular member, cam 340, through the structure described heretofore, begins to push the bag pusher assembly 27 in a rearward direction at about the cam shaft 280° position (fourth cycle) such that the transverse legs of the pusher plates first engage the rear end portion of the tubular member on the saddle assembly and thence push the tubular member rearwardly along the saddle until said filled tubular member has been pushed onto the separate conveyor assembly. As the filled bag is pushed longitudinally rearwardly such that its upper portion is moved rearwardly of guide rods 203, said upper portion moves between guides 374 which retain the bag top in a closed condition as the filled bag is moved onto conveyor assembly 370. The bag pushoff assembly 27 reaches its rearwardmost position at about the cam shaft 20° position of the fifth cycle, and thence through the next 60° of angular movement of the cam 340, is returned to its forwardmost position.

As may be noted from the sequence chart of FIGURE 21, during the time the bag push off assembly is being returned, the oncoming empty tubular member carried by the carriage assembly is moved forwardly. However, since the oncoming tubular member at this time is empty and in a generally flat condition, and the curved legs of the saddle plates 246, 247 diverge in a forward direction, the carriage assembly conveys the oncoming tubular member between said curved legs, it being noted that the minimum spacings between the curved legs is less than the maximum transverse dimension of the filled tubular member.

Even though the description of operation has been set forth starting with about the 265° angular position of the main cam shaft 53 of a first cycle, at which time the lower edge 44c of the unsevered web as illustrated in FIGURE 4 is depending from the pinch rolls to be initially fed downwardly through the time interval the shaft has been operated to the cam shaft 80° angular position (fifth cycle) wherein the bag push off assembly has been returned to its forwardmost position after pushing the filled bag onto conveyor 370, said filled bag being the tubular member formed from the web initially fed at the cam shaft 280° position (first cycle), for each 360° revolution of cam shaft 53, one tubular member is severed from the web, one tubular member is filled, and etc. Accordingly, a number of tubular members are being processed through the machine of this invention at any one time, provided it is set on automatic operation (switch member 415 connecting terminals 399, 424) and there have been no interruptions of operation due to starter 407 being de-energized.

If it is desired to operate the machine manually, then switch member 415 is positioned to break the connection between terminals 399, 424, and to electrically connect terminals 399 and 403; switches 393, 450 anad 520 also being closed. Thus upon closing switch 410 for sufficient time to energize starter 407, cam shaft 53 is operated from a 265° angular position until its next 265° angular position (rotated 360°) wherein the indentation of cam member 402 is beneath switch 401 to de-energize the starter and thereby stop the drive to cam shaft 53. That is, switch 410 is retained in closed position for a period of time less than required for the cam shaft 53 to rotate through a cycle 360° but long enough that cam 402 is rotated sufficiently to close switch member 401. Further, the preceding description in this paragraph is based upon the assumption that the machine has been stopped at the 265° angular position of cam shaft 53 prior to the time switch 415 is moved to break the connection between terminals 399, 424 and to electrically connect terminals 399, 403. In this connection it is noted that during manual operation, the hold-in circuit for the starter for automatic operation provided by switch member 419, switch member 415 and relay 416 is broken by switch member 415 being moved to electrically connect terminals 399 and 403.

Also to be mentioned is that if at any time it is desired to have the pinch rolls feed additional material downwardly between the web pusher assembly and block carrier chain, switch 450 is closed and switch member 415 is positioned to electrically connect terminals 399, 403, the stop switch 396 being depressed to stop the machine.

What we claim is:

1. Apparatus for receiving and conveying film type material in a rearward direction comprising a longitudinally elongated main frame, an endless conveyor member having an inner run portion, means on the frame for mounting said conveyor member for movement about an endless path of travel and retaining said inner run portion in a generally linear, longitudinally extending condition, a longitudinally elongated pusher member, means for selectively transversely moving said pusher member between a first position adjacent said inner run portion and a second position substantially more remote from said inner run portion wherein film may be dependingly extended between said pusher member and inner run portion, means mounted on said inner run portion for receiving film as film dependingly extended between said inner run portion and pusher member is moved adjacent said inner run portion by the pusher member and frictionally retaining the film to at least in part depend therefrom as said pusher member is moved to its second position, said pusher member having means for forcing the film material into frictional holding engagement with the film retaining means as the pusher member is moved to its first position.

2. The apparatus of claim 1 further characterized in that the film retaining means comprises a plurality of longitudinally spaced blocks, each block on said inner run portion having a channel opening toward said pusher member.

3. The apparatus of claim 1 further characterized in that said frame includes a longitudinally elongated subframe transversely remote from the pusher member in its second position, said conveyor member mounting means being mounted on said subframe, that there is provided means on the frame at a higher elevation than said conveyor member and the pusher member for intermittently feeding film material in a flattened condition downwardly transversely between said conveyor member and the pusher member in its second position, a film severing member, means mounted on said sub-frame for moving said film severing member along a path of travel above said inner run portion to sever film material when said pusher member is in its first position.

4. The apparatus of claim 38 further characterized in that there is provided a scale hopper directly above the spout jaws in said carriage assembly second position for automatically dumping a weighed charge of product to descend to the spout jaws when said carriage assembly is in said carriage assembly second position, said carriage assembly having means mounted on the carriage frame for, in said carriage assembly second position, directing the dumped product from said scale hopper to said jaws.

5. The apparatus of claim 4 further characterized in that the conveyor means includes endless conveyor members having adjacent, generally longitudinally rearwardly extending inner runs for abuttingly engaging the tubular member substantially below its marginal edges to convey the tubular member rearwardly and to extend vertically beneath said jaws and further longitudinally rearwardly than said jaws in the assembly first position, said inner runs having rearward inner run portions, and operable first means mounted on the frame for driving the last mentioned conveyor members, mounting them in the above manner, and transversely spreading said inner run portions generally transversely relative one another and alternately moving them to a generally abutting condition, that there is provided means on the main frame forwardly of said inner run portions for slitting the leading and trailing edge portions extending above said inner runs and transversely spreading the marginal edge portions in opposite directions, said first means having means acting in cooperation with the inner runs for retaining said marginal edge portions in a spread condition as the tubular member is conveyed rearwardly of the spreading means and when the inner run portions are in a generally abutting condition, and means operated in timed relationship to the first mentioned conveyor member and the assembly moving means for driving said last mentioned conveyor members to move the tubular member directly beneath said jaws as the assembly is being moved from its first position toward its second position and moving said inner run portions from their generally abutting condition after the tubular member is directly beneath said jaws.

6. Apparatus for severing a tubular member from a continuous length of flattened tubular film type material having a leading edge, a trailing edge, a terminal edge extending between said leading and trailing edges and a bottom closure seam adjacent said terminal edge, conveying the severed tubular member, opening the tubular member and discharging the product into the opened tubular member comprising a longitudinally elongated main frame having a front end portion and a rear end portion, first means mounted on the frame front end portion for supporting the film material with the terminal edge extending longitudinally at a datum elevation, and thence automatically sequentially feeding the film material to a lower elevation than said datum elevation, severing a tubular member having opposed sidewalls that includes said terminal edge and marginal edges defining a tubular member mouth from said continuous length of material, and then conveying the severed tubular member toward the frame rear end portion, second means mounted on the frame rear portion for at a receiving position receivably holding the tubular member, opening the tubular member mouth to a product receiving condition, conveying the tubular member rearwardly to a position longitudinally remote from the receiving position, discharging product into the tubular member at the remote position and then releasing said tubular member, third means mounted on the frame for receiving the tubular member as it is being conveyed rearwardly by the first means, conveying the tubular member, preparing the tubular member to have the tubular member mouth opened to a product receiving condition and then transferring the tubular member to the second means at said receiving position, and means for automatically sequencing and operating the first, second and third means in the aforementioned manner.

7. The apparatus of claim 6 further characterized in that the first means includes a pair of longitudinally elongated, cooperating pinch rolls rotatably mounted on said frame front portion, a knife, means for mounting and longitudinally moving said knife along a longitudinally extending linear run beneath said pinch rolls, first endless conveyor means having a longitudinally extending linear run beneath the knife moving means linear run for receiving film material and supportingly conveying a tubular member severed from the film material toward the frame rear portion, means mounted on the frame transversely opposite said first conveyor means linear run for transversely pushing film material depending from the pinch rolls into the first conveyor means film receiving and tubular material holding condition, and thereafter move away from said first conveyor means, said film material being extended between the pinch rolls in depending relation thereto with its terminal edge at the datum elevation adjacent the elevation of the knife and transversely between the first conveyor means linear run and the pusher means, means for rotatably driving said pinch rolls to feed a length of film material to depend therefrom and extend below said datum elevation a distance that is substantially the length of the tubular member to be formed and then stopping said pinch rolls, fourth means for mounting the knife mounting means and the first conveyor means in the aforementioned relationship and operating the knife mounting means to move the knife to sever said length of tubular member from the continuous film material after said pusher means has moved the continuous film into receiving engagement with said first conveyor means, and thence operating the first conveyor means to convey the severed tubular member longitudinally rearwardly after the pusher means has been moved away from said first conveyor means.

8. The apparatus of claim 7 further characterized in that said pusher means includes a longitudinally elongated pusher member and means on the frame for moving the pusher member transversely toward and adjacent to, alternately away from said first conveyor means, that said knife mounting means includes an endless conveyor member having said knife moving means linear run, that the fourth means includes first drive means for driving said first conveyor means as it is holdingly supporting a severed tubular member and after the pusher member is moved away from said first conveyor means, and discontinuing the drive when the pusher member is moved toward the first conveyor means, second drive means for continuously driving said endless conveyor member in timed relationship to move said knife along its linear run to sever said film material when the pusher member is adjacent said first conveyor means, and means for operating said first and second drive means in the aforementioned manner.

9. The apparatus of claim 8 further characterized in that said first conveyor means includes an endless conveyor member mounted to have the first conveyor means linear run, and a plurality of blocks mounted on the last mentioned linear run in longitudinally spaced relationship, said blocks on the last mentioned linear run having channels opening toward said pusher member, said block channels and said pusher member being of relative sizes and shapes for moving the adjacent portion of the film into said channels and reversely bend the film material in said block channels as the pusher member is moved toward and adjacent the first conveyor means.

10. The apparatus of claim 9 further characterized in that the third means includes longitudinally elongated fifth means extending adjacent the rearward portion of the first conveyor means for receivingly engaging the tubular member at a lower elevation than the first conveyor means as the severed tubular member is moved rearwardly by said first conveyor means and then conveying the tubular member in upright depending flat condition toward the frame rear portion, means mounted adjacent the fifth means for slitting the leading and trailing edge portions that extend above said third means and spreading the sidewall upper slitted portions transversely outwardly of one another as the fifth means conveys the tubular member adjacent thereto, means mounted on the frame for mounting the fifth means in the above manner and driving said fifth means, said means for operating the first and second driving means including a driven shaft, means for continuously drivingly connecting said shaft to the fifth means drive means, means keyed to said shaft for continuously drivingly connecting said shaft to the second drive means, and means mounted on said shaft for intermittently driving said first drive means.

11. The apparatus of claim 6 further characterized in that the second means includes a carriage frame, means mounted on the main frame for mounting the carriage frame for longitudinal movement between a first position relative to the third means to at least in part be directly above the tubular member in a longitudinally centered condition relative to the tubular member during an interval of time that the tubular member is being conveyed by said third means, and a second position rearwardly and longitudinally remote from said carriage frame first position, means mounted on the carriage frame for movement therewith and relative thereto for holdingly engaging the tubular member upper leading edge and trailing edge portions as it is being conveyed by said third means and subsequently releasing said tubular member, a pair of spout jaws movable between a closed condition and an open condition, said spout jaws in a closed condition being transversely convergingly tapered in a downward direction, means mounted on the carriage frame for movement therewith and relative thereto for moving said spout jaws to move between a dwell closed position at a higher elevation than the tubular member as it is conveyed by said third means, an intermediate closed position extending to a lower elevation than the uppermost portion of the tubular member as it is being conveyed by said third means, and a spread apart open position extending to a lower elevation than said uppermost portion, and that said operating means includes means for operating the carriage frame between its positions in the aforementioned manner, means for operating the holdingly engaging means to holdingly engage the tubular member after the carriage frame has been moved to said longitudinally centered condition and prior to the third means releasing the tubular member being conveyed thereby, and releasing the tubular member after the carriage frame has moved to its second position, means for operating the spout jaw moving means to move the spout jaws from their dwell position to their intermediate position to extend into the tubular member mouth after the tubular member is being holdingly engaged by said holdingly engaging means, then toward their open position after the third means begins to release the tubular member and thence to their open position to open said mouth to a product receiving condition after the third means has released the tubular member.

12. The apparatus of claim 11 further characterized in that there is provided operable means for discharging a weighed charge of product downwardly through the spout jaws when the carriage frame is in its second position, and means for operating said discharge means to discharge product in timed relation to descend through said spout jaws after the carriage frame is in its second position, said second means including means mounted on the carriage frame to move therewith for cooperating with the spout jaws in their open position to supportingly hold the tubular member longitudinally intermediate said leading edge and trailing edge portions in a product receiving condition.

13. The apparatus of claim 12 further characterized in that there is provided a saddle for at least partially supporting the tubular member as a product is being discharged thereinto, means mounted on the main frame rear portion for mounting said saddle and moving said saddle between a lower position and an elevated position, means operated in timed relationship to said carriage frame and the holdingly engaging and product discharge means for operating said saddle moving means to move the saddle to its lower position prior to the time product is being discharged into said tubular member, and after product is being discharged therein and prior to the holdingly engaging means releasing the tubular member, move the saddle toward its elevated position to elevate the tubular member.

14. The apparatus of claim 13 further characterized in that there is provided a tubular member push off assembly having a pair of transversely spaced pusher plates, means mounted on the main frame for mounting said pusher plates in transversely spaced relationship and for movement along a path of travel beneath the carriage frame and at least in part above the saddle in its elevated position between a first position beneath the carriage frame in its first position and a second rearward position to have completely moved the filled tubular member off the saddle, said pusher plate mounting means having the pusher plates mounted thereon in sufficient transversely spaced relationship for holdingly engaging means conveying the empty tubular member therebetween as the carriage frame moves toward its second position, and of a maximum spacing less than the corresponding dimension of the member having the weighed charge of product therein, and means operated in timed relationship to the holding engaging means, saddle moving means and the carriage frame operating means for operating the pusher plate moving means to move the pusher plates toward their first position as the carriage frame is moved toward its second position, and moving the pusher plates toward their second position after the holdingly engaging means has released the tubular member and the saddle is at least substantially in its elevated position.

15. The apparatus of claim 14 further characterized in that there is provided a pair of elongated guide members, means for mounting said guide members on the main frame to extend longitudinally above the saddle and moving said guide members from a transverse spread apart condition to an adjacent condition abutting against opposite tubular member sidewall portions above the level of the weighed charge of product in the tubular member, and means operated by the saddle operating means for moving said guide members from their spread apart condition as the saddle is being elevated to the tubular member abutting condition at the time the saddle is in its elevated position.

16. The apparatus of claim 6 further characterized in that the third means includes a frame member mounted on the main frame, a pair of endless conveyor members mounted to have inner runs abuttable against opposite tubular member sidewalls below said marginal edges to convey the severed tubular member, forward end portions adjacent said first means and at an elevation below said marginal edges for receiving the severed tubular member as it is being conveyed by the first means, and rearward end portions adjacent the second means when the second means receives the tubular member, fourth means for mounting one conveyor member rearward end portion and transversely moving said one rearward end portion between a datum position and a second position transversely outwardly of the above datum position, fifth means for mounting the other conveyor member rearward end portion and transversely moving the last mentioned rearward end portion between a datum position closely adjacent the one conveyor member rearward end portion datum position and a position transversely outwardly in the opposite direction from the movement of the one conveyor member rearward end portion toward its second position, sixth means mounted on the frame member for mounting the conveyor members front portions in the aforementioned manner and driving the conveyor members to move their inner runs in the same direction to convey the tubular member toward the frame rear end portion, and that said operating means including means for mounting and moving said fourth and fifth means from their datum position transversely outwardly after the second means is receivingly holding the tubular member.

17. The apparatus of claim 16 further characterized in that said third means includes means mounted on said frame member for spreading the upper tubular sidewall portions that extend above said conveyor members transversely opposite one another as the conveyor members convey said tubular member and retaining them in the spread apart condition in preparation for opening the tubular mouth to a product receiving condition as the tubular member is conveyed adjacent said fourth and fifth means, said fourth and fifth means each having means for cooperating with the respective conveyor member for retaining one upper sidewall portion in its spread apart condition as it is moved rearward of said spreading means and the fourth and fifth means are in their datum positions, that said second means includes a cooperating pair of movable spout jaws movable between an open condition and a closed condition, said jaws in a closed condition being transversely convergingly tapered in a downward direction, and means connected to said jaws for moving said jaws in a closed condition transversely between said upper sidewall portions and between a closed position and a spread apart condition, and that said operating means includes means for operating the jaw moving means to at least initially move said jaws transversely between said upper sidewall portions when the tubular member is being conveyed by said inner runs and after the fourth and fifth means are being moved transversely outwardly, and thereafter move said jaws to an open position to open said tubular mouth to a product receiving condition.

18. The apparatus of claim 17 further characterized in that said sixth means includes a pair of transversely spaced drive members respectively mounted in driving engagement with the conveyor members, that there is provided a pair of transversely spaced idler conveyor members mounted longitudinally intermediate said conveyor member front and rearward end positions and in abutting relationship with one of the conveyor member inner runs for retaining it adjacent the other conveyor member inner run, said fourth and fifth mounting and moving means rotatably mounting said idler members in positions and the idler members being of size that each inner run has a portion longitudinally intermediate the one idler member and the respective drive member that extends generally linearly even when the fourth and fifth means are moved to their transverse outer positions, and that said spreading means includes a knife and means connected to said frame member for mounting said knife to slit the leading edge and trailing edge of the tubular member extending above said conveyor members as it is being conveyed by said linear inner run portions.

19. The apparatus of claim 17 further characterized in that second means includes operable means for holdingly engaging longitudinally spaced leading and trailing edge portions of the tubular member at an elevation adjacent and below the conveyor members and alternately releasing said holding engagement, and that the first mentioned operating means includes means for operating the said operable means for holdingly engaging said tubular member prior to the spout jaws being moved from their closed position toward their open condition and the fourth and fifth means being moved from their datum positions toward their transverse outer positions.

20. The apparatus of claim 19 further characterized in that said jaw mounting and moving means includes a carriage frame, means mounting said carriage frame for longitudinal movement between a first position forward of said conveyor member rearward end portions and a second position longitudinally remote from the carriage frame first position, means mounted on the carriage frame for mounting and moving said spout jaws between a first dwell closed position at a higher elevation than said conveyor member inner runs, a second closed position extending to a lower elevation than said inner runs, and then to a third spread apart position, and that said means for operating the spout jaw moving means includes means on the main frame for moving said carriage frame from its second position to its first position, and then towards its second position as the tubular member is being conveyed by said inner runs, and during a portion of the movement toward the second position, move said carriage frame at the same rate of movement of the tubular member being conveyed by said inner runs and in timed relation to the movement of said inner runs to position the closed spout jaws directly above and in longitudinally centered relationship to the tubular member then being conveyed by said inner runs rearwardly of said spreading means, means for operating the last mentioned spout jaw mounting and moving means to move said spout jaws downwardly toward said second closed position when the spout jaws are in said longitudinally centered relationship into the tubular member, and then, after the fourth and fifth means have started moving toward their transverse outward positions to open the tubular member to a product receiving condition, move said spout jaws toward said spread apart condition.

21. The apparatus of claim 20 further characterized in that each of said fourth and fifth means includes an elongated swing arm having a rear portion and an idler conveyor member rotatably mounted on each swing arm rear portion for mounting the respective conveyor member rear portion, and the means for mounting the fourth and fifth means includes means for movably mounting the respective swing arm on the frame member to pivot about a generally vertical axes adjacent said frame member and to extend generally longitudinally toward the frame rear portion.

22. Apparatus for conveying in a rearward direction in a flattened upright condition, a tubular member having opposed sidewalls providing an openable tubular member mouth and joined together at a leading edge, a trailing edge and a bottom edge, and then automatically opening said tubular member mouth to a product receiving condition as said tubular member is being conveyed, comprising a longitudinally elongated main frame, a first and a second elongated swing arm each having a front end portion and a rear end portion, a mounting member mounted on the frame, operable means mounted on said mounting member and attached to swing arm front end portions for mounting said arms to extend generally longitudinally rearwardly and first retaining said swing arms in a first position closely adjacent, generally parallel relationship, then moving said swing arms relative to one another to a second position that their rear end portions are more remotely spaced from one another, and thereafter return said arms to their first position, means for conveying a flattened tubular member including an endless conveyor belt for each swing arm, a rear pulley sheave dependingly, rotatably mounted on each swing arm rear portion, each belt being extended around the respective rear pulley sheave and having an inner run portion, means for each belt mounted on said mounting member for mounting the portion of the respective belt remote from the corresponding rear pulley sheave and driving said respective belt, said rear pulley sheave and belt mounting means being mounted in positions relative one another to in the swing arm first position hold said inner runs in abutting relationship when no tubular member is being conveyed thereby, a traveling carriage assembly, means mounting said assembly on the frame for movement between a first position adjacent said belt inner run portions and a second position remote from said assembly first position, said carriage assembly including means for grippingly engaging said tubular member as said tubular member is being conveyed by said belt inner run portions to convey said tubular member and opening said tubular member mouth to a condition for receiving a charge of product, means for moving said assembly between said assembly positions including operating the carriage assembly to grippingly engage a tubular member being carried by said belts adjacent said swing arms prior to any substantial movement of said swing arms toward their second position and thereafter opening the tubular member mouth after substantial movement of the swing arms toward their second position, and means connected to said swing arm operable means and operated in timed sequence with carriage assembly operating means for moving the swing arms between said positions in the aforementioned manner including moving said swing arms to their first position after the carriage assembly has been moved a substantial distance from its first position toward its second position.

23. The apparatus of claim 22 further characterized in that said mounting member includes a pair of transversely spaced shafts, each of said shafts being adjacent one swing arm front portion, and an intermediate pulley sheave mounted on each shaft in abutting relationship with the respective belt inner run portion, that said belt mounting means includes a first front pulley sheave and a second front pulley sheave, each of said front pulley sheaves having the respective one of said belts extended therearound, and means for mounting said first and second front pulley sheaves in transverse spaced relationship a substantial distance longitudinally forwardly of said intermediate pulley sheaves and relative to one another and the intermediate pulley sheaves to retain the belt inner runs longitudinal intermediate the intermediate pulley sheaves and front pulley sheaves in abutting relationship when no tubular member is being conveyed therebetween, even when said swing arms are in their second positions.

24. The apparatus of claim 23 wherein the sidewalls have top marginal edges defining said mouth and the belt inner runs supportingly hold the tubular sidewalls in abutting relationship substantially below said marginal edges throughout the belt inner runs as the tubular member is being conveyed thereby and the swing arms are in their first position, further characterized in that there is provided means on the front pulley sheave mounting means longitudinally intermediate the front pulley sheaves and the intermediate pulley sheaves for retaining adjacent belt inner run portions closely adjacent one another, a slitter assembly mounted on said mounting member to at least in part overhang above said belt inner runs longitudinally intermediate said intermediate pulley sheaves and front pulley sheaves for slitting the tubular member leading and trailing edges that extend above said belt inner runs and oppositely transversely spreading the slitted, upper sidewall portions of the tubular member to at least in part overlie the respective belt inner run as the tubular member is conveyed thereupon by said belts.

25. The apparatus of claim 24 further characterized in that there is provided tubular member guide means on the mounting member for retaining said upper sidewall portions in their transversely extending spread apart condition as the belts convey the tubular member from adjacent the slitter assembly to adjacent the swing arm rear portions, said swing arms each having means for guiding the adjacent belt inner run portion as it is moved toward the rear pulley sheave and maintaining the respective inner run portion closely adjacent the transversely adjacent other inner run portion when the swing arms are in their first position, and a longitudinally elongated, transverse inner edge portion partially extending over the adjacent belt inner run portion to in cooperating therewith retain the respective upper sidewall portion in a generally transversely extending condition in the swing arm first position as the belts convey said tubular member rearwardly of said tubular member guide means.

26. The apparatus of claim 25 further characterized in that said tubular member gripping and opening means includes a carriage frame, means mounted on the carriage frame for movement therewith and relative thereto for releasably gripping the tubular member upper leading and trailing edge portions at an elevation below said belt inner run portions as said inner run portions convey said tubular member, a pair of opposed spout jaws, means mounted on the carriage frame for mounting and moving said spout jaws between an upper position at an elevation above said belt inner run portions and a lower position, and between a transversely spread condition and a closed condition, said spout jaws in a closed condition having sidewall portions transversely convergingly tapered in a downward direction, said assembly operating means including means for operating said releasable gripping means to grippingly engage the tubular member as it is being conveyed by said belt inner run portions and to release the gripping engagement when the carriage assembly is adjacent its second position, and means for operating the spout jaw mounting and moving means to move the spout jaws downwardly in a closed condition into the tubular member mouth to said lower position after the tubular member has been grippingly engaged by said releasably gripping means and then moving the spout jaws to a spread apart condition after the swing arms have been moved from the swing arm first position toward the swing arm second position to spread the tubular member upper sidewall portions.

27. For receiving a flattened tubular member having opposed sidewalls joined together at a leading edge, a trailing edge and a bottom edge and top marginal edges defining an openable tubular member mouth from a conveyor assembly that conveys said tubular member in a rearward longitudinal direction in an upright condition including holding said tubular member at an elevation below said top marginal edges until said tubular member has been conveyed to a given location, and then releasing it, tubular member receiving, opening and filling apparatus comprising a longitudinally extending main frame, a carriage frame, means mounting said carriage frame on said main frame and moving said carriage frame between a first position adjacent said given location, and a second position longitudinally rearwardly of said given location, and retaining said carriage frame at said second position for a given time interval, means mounted on the carriage frame for movement therewith for holdingly engaging the upper leading and trailing edge portions of the tubular member being conveyed by said conveyor assembly to said given location when the carriage frame is adjacent its first position and prior to said conveyor assembly releasing the tubular member, and releasing said tubular member after said carriage frame has moved to its second position, a pair of opposed spout jaws, means mounted on the carriage frame for mounting and moving said spout jaws between an up position at an elevation above the tubular member being conveyed by said conveyor assembly and a lowered second position to extend to a lower elevation than the top marginal edges of the tubular member being conveyed by said conveyor assembly and between a transversely spread condition and a closed condition, said spout jaws in a closed condition having sidewall portions transversely convergingly tapered in a downward direction, means for operating the tubular member holdingly engaging and relasing means in the aforementioned manner, means for operating the spout jaws mounting and moving means to move the spout jaws in a closed condition from the up position downwardly into the tubular member mouth between said marginal edge after the holdingly engaging and releasing means are holdingly engaging the tubular member and then moving said jaws to the spread condition to open said tubular mouth to a product receiving condition after the tubular member has been released from said conveyor assembly.

28. The apparatus of claim 27 further characterized in that there is provided a spout portion fixedly mounted on the carriage frame to extend downwardly into the spout jaws both in their up position and second position for directing product to said spout jaws, that said spout jaw mounting and moving means includes a mounting member, parallel linkage means connected to said carriage frame to pivot about transverse axes for mounting said mounting member to move between an up position and a lowered position, and longitudinally extending first means fixedly attached to said spout jaws and mounted on said mounting member to move therewith and pivot relative thereto about longitudinal axes for moving said spout jaws between their spread and closed conditions, and that said spout jaw operating means includes second means mounted on the carriage frame and connected to the first means for first moving the first means downwardly to thereby move the mounting member and spout jaws downwardly to the spout jaw second position and then pivot said first means about said longitudinal axes to move the spout jaws to their spread condition, and means mounted on the carriage frame and acting in cooperation with the second means for moving the mounting member downwardly and stopping the downward movement of the mounting member when said spout jaws are in their second position.

29. The apparatus of claim 28 further characterized in that said first means includes a pair of rods fixedly attached to the spout jaws and mounted on the mounting member in transverse spaced relationship to respectively pivot about one of said longitudinal axes, and that the second means includes a two way acting piston cylinder combination and linkage means operated by said combination and connected to said rods for moving the rods and thereby the mounting member downwardly until stopped by said cooperating means and then pivoting said rods about said longitudinal axes in opposite angular directions to move the spout jaws from a closed condition to a spread condition, and control means operated in timed relationship to the movement of the carriage frame for actuating the piston cylinder combination to move the spout jaws in the above mentioned manner including subsequently returning the spout jaws to their up-closed position.

30. The apparatus of claim 28 further characterized in that said conveyor assembly includes a pair of generally longitudinally extending conveyor belts having inner run portions, means mounted on the main frame for mounting said conveyor belts and drive said conveyor belts to move a tubular member longitudinally toward the carriage assembly, the last mentioned means including operable means for mounting and moving said inner run portions between a first position to abuttingly engage opposite sidewall portions of the tubular member and cooperate with said inner run portions for conveying said tubular member in condition to be opened for receiving product, and a second position diverging in a direction longitudinal toward the carriage assembly, said inner run portions and operable means in moving from the inner run portion first position to the second position releasing said tubular member, and means operated in timed sequence with the movement of the carriage assembly and the spout jaw operating means for operating said operable means from their first position toward their second position as the spout jaws are moved downwardly.

31. The apparatus of claim 27 further characterized in that the carriage frame and the spout jaws each has a longitudinal front portion and a longitudinal rear portion, that the holdingly engaging and releasing means includes a pair of front gripper feet, and a pair of rear gripper feet, first means mounted on the carriage frame for mounting the front gripper feet to transversely move one relative the other between a gripping position and a release condition and moving the front gripper feet between their ransverse positions, and also mounting said front gripper feet to pivotally move about a transverse axis between a datum first position at a lower elevation than said conveyor assembly and forwardly of said spout jaw front portions, and a second position more closely adjacent said spout jaws front portions, second means mounted on the carriage frame for mounting the rear gripper feet to transversely move one relative the other between a gripping position and a release condition and moving the rear gripper feet between their transverse positions, and also mounting said rear gripper feet to pivotally move about a transverse axis between a datum first position at a lower elevation than said conveyor assembly and rearwardly of said spout jaw rear portions, and a second position more closely adjacent said spout jaw rear portions, means connected to said first and second means for resiliently urging said first and second means to their respective gripper feet first positions.

32. The apparatus of claim 31 further characterized in that each of the front and rear gripper feet mounting means includes a transverse pivot member pivotally mounted respectively on the front and rear portions of the carriage frame and having a one end portion and an opposite end portion, means keyed to the front pivot member one end portion for mounting the other front gripper foot transversely adjacent and at a lower elevation that the spout jaws in a lowered and closed condition, means keyed to the rear pivot member one end portion for mounting the other rear gripper foot transversely adjacent and at a lower elevation than the spout jaws in a lowered and closed condition, means connected to the one rear gripper foot for moving the one rear gripper foot transversely toward and alternately away from said other rear gripper foot, means keyed to the rear pivot member opposite end portion for mounting the rear gripper foot moving means transversely spaced from the other rear gripper foot, means connected to the one front gripper foot for moving the one front gripper foot transversely toward and alternately away from said other front gripper foot and means keyed to the front pivot member opposite end portion for mounting the front gripper foot moving means transversely spaced from the other front gripper foot.

33. Apparatus for receiving, longitudinally conveying, and filling an empty tubular member in a generally upright, flattened condition having opposed sidewalls joined together at leading, trailing and bottom edges and top marginal edges in a transversely spread apart condition defining a tubular member mouth and subsequently moving the filled tubular member comprising a longitudinally elongated frame, a cartridge frame, means mounting the carriage frame, for longitudinal movement between a first empty tubular member receiving condition and a tubular member filling position, first means mounted on the carriage frame for movement therewith and relative thereto for holdingly engaging the empty tubular member at said tubular member receiving position to supportingly convey the tubular member as the carriage frame moves, further spreading said marginal edges to open the held tubular member to a product receiving condition as the carriage frame moves toward its second position and directing a weighed charge of products into the held, opened tubular member when the carriage frame is in its second position and thence release said held, opened tubular member after the weighed charge is therein, means mounted on the frame for, in cooperation with the first means, directing a weighed charge of product into the tubular member when the carriage frame is in its second position, means for moving the carriage frame between said positions and retaining the carriage frame in its second position until after the first means has released the tubular member, second means for supporting and moving the released tubular member to a location longitudinally rearwardly of said carriage frame second positions, and means operated in timed relationship to said carriage frame moving means for operating the second means in the aforementioned manner.

34. The apparatus of claim 33 further characterized in that first means includes third means mounted on the carriage frame for holdingly engaging longitudinally spaced leading and trailing edge portions of the tubular member below said marginal edges and subsequently releasing said holding engagement, and spout means mounted on the carriage frame for movably extending into the tubular mouth after the holdingly engaging means are holdingly engaging said edge portions, thence moving said tubular mouth to a product receiving condition as the carriage frame is moving toward its second position, and directing a weighted charge into the tubular member, and that the operating means includes means for operating the third means to holdingly engage said edge portions, thence moving said tubular mouth to a product receiving condition as the carriage frame is moving toward its second position, and directing a weighed charge into the tubular member, and that the operating means includes means for operating the third means to holdingly engage said edge portions to supportingly convey the tubular member when the carriage frame is intermediate its first position and second position, and release said edge portions after the weighed charge has been directed into said tubular member, and operating the spout means to movably extend into the tubular mouth after the third means is holdingly engaging said edge portions and then to open said tubular mouth to a product receiving condition.

35. The apparatus of claim 34 further characterized in that the second means includes a longitudinally elongated, V-shaped saddle, means mounted on the main frame for mounting said saddle beneath the carriage frame in its second position and moving said saddle between a lower position supportingly abutting against the tubular member that is being holdingly engaged by the first means in the carriage frame second postiion, and an elevated condition at a substantially higher eleveation than said lower position, a pair of pusher plates, longitudinally movable means for mounting the pusher plates relative the movement of the carriage frame and in sufficient transversed spaced relationship for the empty tubular member to be moved between the said plates and sufficiently close to one another to abuttingly engage and push the tubular member after the weight charge of product is therein, longitudinally elongated means mounted on the main frame for mounting the pusher plate mounting means to retain the pusher plates at an elevation below the carriage frame and at least in part above the saddle as the pusher plates are moved, said operating means including means operated in timed relationship to the carriage frame moving means for moving the pusher plates toward the carriage frame first position as the carriage frame is moved toward its second position, and in an opposite longitudinal direction to a position relative the saddle in an elevated condition for pushing the tubular memmer substantially off the saddle, after the tubular member has the weighed charge therein and it has been released.

36. The apparatus of claim 35 further characterized in that each pusher plate has a leg extending transversely toward the other pusher plate and a curved leg joined to the transversely extending leg adjacent the other transverse leg, said curved legs being shaped to diverge from one another in a direction longitudinally opposite the first mentioned direction.

37. In apparatus for conveying a generally flattened tubular member in an upright condition in a longitudinal rearward direction to a given location, the aforementioned tubular member having opposed sidewalls joined together at a leading edge, a trailing edge and a bottom edge and generally transversely oppositely extending upper sidewall portions adjacent an openable tubular member mouth, and then opening the tubular mouth to a product receiving condition, a frame, conveyor means mounted on the frame for conveyingly supporting the tubular member below said sidewall portions in a longitudinal direction and retaining said sidewall portions in their transversely extending conditions, said conveyor means including a pair of generally longitudinally extending, endless conveyor members, each having an inner run portion for supportingly conveying the tubular member in the aforementioned manner, means for drivably mounting said conveyor members and moving said inner run portions between a generally abutting condition and a transversely spread apart condition, a carriage frame having a front end portion and a rear end portion, a pair of cooperating spout jaws, means mounted on the carriage frame mounting said spout jaws for movement between an up-closed position, a down-closed position extending to a lower elevation than said inner run portions, and a down-open position, said spout jaws in a closed condition converging in a downward direction, means for mounting said carriage frame on the main frame to position said spout jaws in an up-closed position directly above the tubular member being supportingly conveyed by said inner run portions in said run portions abutting condition to be movably extended between said sidewall portions, means movably mounted on the carriage frame for holdingly engaging longitudinally spaced leading edge and trailing edge sidewall portions at an elevation below said inner run portions and subsequently releasing said holding engagement, the last mentioned means including a first transversely elongated pivot member pivotally mounted on the front portion of the carriage frame, a second transversely elongated pivot member pivotally mounted on the rear portion of the carriage frame, a pair of front gripper feet, a pair of rear gripper feet, first means keyed to said first transverse member for mounting the front gripper feet to transversely move one relative the other between a release position and a position to abuttingly, supportingly engage the tubular member trailing edge portion below said inner run portions in their generally abutting condition, means keyed to the second transverse pivot member for mounting the rear gripper feet to transversely move one relative the other between a release position and a position to abuttingly, supportingly engage the tubular member leading edge portion below said inner run portions in their abutting condition, means connecting said transverse pivot members for resiliently urging said pivot member to, through their gripper feet moving means, move the front gripper feet relative the rear gripper feet to a longitudinally spread apart, datum condition that the front gripper feet are located longitudinally forwardly of the spout jaws and the rear gripper feet are longitudinally rearwardly of the spout jaws while permitting the rear gripper feet and front gripper feet moving relative one another to a longitudinally more closely adjacent position, said gripper feet moving means including operating means for transversely moving the one front and rear gripper feet relative the other front and rear gripper feet in timed relation to grippingly engage the tubular member supportingly conveyed by said inner run portions in their generally abutting condition, means for operating the spout jaws moving means to move the spout jaws from the up-closed position to a down-closed position extending into the tubular member after the gripper feet have moved transversely to their gripping position, and subsequently to a down-open position, means operated in timed relationship to spout jaw operating means and the gripper feet moving means for operating the conveyor mounting and driving means to retain said inner run portions in an abutting condition until the gripper feet are gripping the leading and trailing edge portions and the spout jaws are moving from the up-closed position to the down-closed position and then moving said inner run portions toward their spread apart condition as the spout jaws are moved adjacent their down-closed position, and moving said inner run portions to their spread apart conditions prior to their down-open position, said spout jaws in moving to their down-closed position moving into the tubular member mouth, and in moving to their open position, transversely spreading the sidewalls whereby through the spreading of the sidewalls the gripped leading and trailing edge portions are moved more closely adjacent one another to cause said front gripper feet to be relatively moved longitudinally more closely adjacent the rear gripper feet.

38. Apparatus for receiving and conveying film type material wherein said film material is a continuous length of tubular web material having spaced along the length thereof a plurality of transverse closure seams that are spaced from one another by a distance substantially equal to the length of the tubular member to be severed from said web material, a longitudinally leading edge and a trailing edge, said apparatus comprising a longitudinally elongated main frame, an endless conveyor member having an inner run portion, means on the frame for mounting said conveyor member for movement about an endless path of travel and retaining said inner run portion in a generally linear, longitudinally extending condition, said conveyor mounting means including a driven member for moving said conveyor member in its path of travel, a longitudinally elongated pusher member, means for selectively transversely moving said pusher member between a first position adjacent said inner run portion and a second position substantially more remote from said inner run portion wherein film may be dependingly extended between said pusher member and inner run portion, means mounted on said inner run portion for receiving film as film dependingly extended between said inner run portion and pusher member is moved adjacent said inner run portion by the pusher member and frictionally retaining the film to at least in part depend therefrom as said pusher member is moved to its second position, said pusher member having means for forcing the film material into frictional holding engagement with the film retaining means as the pusher member is moved to its first position, said frame including a longitudinally elongated subframe transversely remote from the pusher member in its second position, said conveyor member mounting means being mounted on said subframe, intermittent feed means on the frame at a higher elevation than said conveyor member and the pusher member for intermittently feeding film material in a flattened condition downwardly transversely between said conveyor member and the pusher member in its second position, a film severing member, means mounted on said subframe for moving said film severing member along a path of travel above said inner run portion to sever film material when said pusher member is in its first position, said intermittent feed means including pinch rolls on the frame for feeding said web material, and means for operating said pinch rolls to feed a length of web material substantially the length of tubular member to be formed below the path of travel of said severing member and a closure seam just above the path of travel of said severing means, and then stopping said pinch rolls, means for operatively driving said driven member to drive said conveyor member and alternately discontinue applying drive to said driven member, means for automatically operating said pusher member moving means to move the pusher member to its first position after the pinch rolls are stopped and the drive to said driven member has been discontinued, and to move said pusher member toward its second position before driving said driven member, means synchronized with the conveyor member moving means for operating said severing member moving means to move the severing member to sever the web material just below the last mentioned closure seam to form free marginal edge portions defining a tubular mouth during the time interval the pusher member is in its first position, a traveling carriage assembly, means mounted on the frame for mounting said traveling carriage assembly to be moved between a first position spaced from said conveyor member and a second position longitudinally more remotely spaced from said conveyor member, means for receiving the flattened tubular member from the conveyor member, and then conveying the tubular member to a position longitudinally adjacent the traveling carriage assembly in its first position, means on the frame for driving said conveyor means, said traveling carriage assembly including a carriage frame, means mounted on the carriage frame for automatically grippingly engaging said tubular member adjacent its upper end portion as it is being conveyed by said conveyor means adjacent said assembly first position, then supportingly holding the thus gripped tubular member as said assembly moves from adjacent its first position to its second position and then releasing said tubular member after said assembly has moved to its second position, cooperating spout jaws, and means mounted on the carriage frame for mounting the spout jaws to move between opened and closed conditions and automatically moving the spout jaws in a closed condition at least partially into the tubular member and thereafter moving said spout jaws to an open condition to more fully open said tubular member as it is being held by said gripping means and retaining said jaws in an open condition until said assembly has been moved to its second position, and means mounted on the main frame and connected to said assembly for moving said assembly between its first and second positions in timed relationship to the conveyor means at a location for the gripping means to grip the tubular member at a location to have the spout jaws move at least partially thereinto.

39. The apparatus of claim 1 further characterized in that the film retaining means comprising a plurality of blocks that are generally U-shaped in vertical cross section mounted in spaced relationship on said endless conveyor member including longitudinal spaced blocks mounted on the inner run portion, each block on the inner run portion having a pair of vertically spaced legs, and that the pusher member comprises a longitudinally elongated tongue at an elevation vertically intermediate said legs for forcing the film into frictional holding engagement with said blocks.

40. The apparatus of claim 1 further characterized in that there is provided means on the frame at a higher elevation than said conveyor member and the pusher member for intermittently feeding film material in a flattened condition downwardly between said conveyor member and the pusher member in its second position, a film severing member, means mounted on the frame for moving said film severing member along a path of travel above said inner run portion to sever film material when said pusher member is in its first position, and means for driving the conveyor member when the pusher member is out of its first position and discontinuing the drive to the conveyor member before the pusher member is moved to its first position.

41. The apparatus of claim 40 further characterized in that continuously driven conveyor means is mounted on the frame to receive the severed film frictionally held by the film retaining means and convey the film rearwardly of the conveyor member.

42. Apparatus for severing a tubular member from a continuous length of flatten tubular film type material having a leading edge, a trailing edge, a terminal edge extending between said leading and trailing edges and a bottom closure seam adjacent said terminal edge, and conveying the severed tubular member rearwardly, comprising a longitudinally elongated main frame having a front end portion and a rear end portion, first means mounted on the frame front end portion for supporting the film material with the terminal edge extending longitudinally at a datum elevation, and thence automatically sequentially dependingly feeding the film material to a lower elevation than said datum elevation, endless conveyor means mounted on the frame and having a longitudinally extending linear run transversely adjacent the film material for receiving film material and supportingly conveying a tubular member severed from the film material toward the frame rear portion, pusher means mounted on the frame for pushing film material depending from the first means into the conveyor means film receiving and tubular material supportingly conveying condition, and thereafter moving away from said first conveyor means, means mounted on the frame above and adjacent said linear run for severing a tubular member from the film member, said film material being extended from the first means in depending relation thereto with its terminal edge at the datum elevation adjacent the elevation of the severing means and transversely between the conveyor means linear run and the pusher means, means for operating said first means to feed a length of film material to depend therefrom and extend below said datum elevation a distance that is substantially the length of the tubular member to be formed and then discontinue the feed of film material and fourth means for operating the severing mounting means to sever said length of tubular member from the continuous film material after said pusher means has moved the continuous film into receiving engagement with the conveyor means, and thence operating the conveyor means to convey the severed tubular member longitudinally rearwardly after the pusher means has been moved away from said conveyor means, said conveyor means including an endless conveyor member mounted to have the conveyor means linear run, and a plurality of blocks mounted on the last mentioned linear run in longitudinally spaced relationship, said blocks on the last mentioned linear run having channels opening toward said pusher means, said block channels and said pusher means being of relative sizes and shapes for moving the adjacent portion of the film into said channels and reversely bend the film material in said block channels as the pusher member is moved toward and adjacent the conveyor means.

43. The apparatus of claim 42 further characterized in that said pusher means includes a longitudinal elongated tongue at the elevation of said channels and means on the frame for moving the tongue transversely toward and adjacent to the blocks to reversely bend the film into the block channels and alternately away from said block.

44. Apparatus for feeding and filling a bag having marginal edges defining a bag mouth, comprising a longitudinally elongated frame, first and second longitudinally elongated endless conveyor members mounted on the frame for conveying an unopened bag having its mouth facing upwardly in a rearward direction toward the discharge end of the apparatus, each conveyor member having an inner run, first means mounted on the frame for mounting said conveyor members with their inner runs in abutting relationship and driving said conveyor members, each inner run having a discharge end portion, second means on the frame for spreading said marginal edges as the bag is being conveyed by said conveyor members, and third means on the frame for opening the bag mouth preparatory to discharging product into the bag, said third means including a pair of hopper jaws spreadable relative to each other, fourth means for moving the hopper jaws above the spread edges as the bag is being moved by said conveyor members, then moving the hopper jaws downwardly adjacent said discharge end portions and between the spread marginal edges, and thence spreading the hopper jaws to open the bag mouth as the bag is being conveyed, said first means including fifth means for spreading apart at least the conveyor member inner run discharge end portions that are adjacent said jaws as said jaws move downwardly into the bag mouth.

45. The apparatus of claim 44 further characterized in that the fourth means includes a carriage, means mounting the carriage on the frame for horizontal movement between a position vertically adjacent said discharge end portion and a position remote therefrom, means for mounting the jaws on the carriage for movement therewith and relative thereto and means on the frame for moving the carriage between its position.

46. The apparatus of claim 45 further characterized in that the fourth means includes means mounted on the carriage for cooperating with the jaws to supportingly convey the open bag as the carriage is moved.

References Cited

UNITED STATES PATENTS

| | | | |
|---|---|---|---|
| 2,853,842 | 9/1958 | Vredenburg | 53—384 |
| 3,264,794 | 8/1966 | Brown et al. | 53—183 X |
| 3,359,648 | 12/1967 | Overly et al. | |

THERON E. CONDON, Primary Examiner

E. F. DESMOND, Assistant Examiner

U.S. Cl. X.R.

53—167; 198—179

PO-1050
(5/69)

UNITED STATES PATENT OFFICE
CERTIFICATE OF CORRECTION

Patent No. 3,469,367      Dated September 30, 1969

Inventor(s) Richard H. Ayres and Gaylerd M. Lieder

It is certified that error appears in the above-identified patent and that said Letters Patent are hereby corrected as shown below:

Column 8, line 58, "14" (first occurrence) should be --13--; line 60, after "144" insert --.--; same line, "to" should be --To--. Column 13, line 67, "Clamp" should be --Champ--. Column 14, line 46, "mounting" should be --mount-- line 50, "another said" should be --said another--. Column 16, line 59, "open" should be --opened--. Column 19, line 71, "close" should be --closed--. Column 21, line 33, "printed" should be --printing--. Column 29, lines 59 and 60, "toward and adjacent to, alternately away from said first conveyor" should be --toward and to a first position adjacent the first conveyor means and alternately moving the pusher member away from said first conveyor--; line 60, after "means" insert --and to a second position substantially more remote from the first conveyor means that the pusher member first position--; line 62, after "run" insert --above the conveyor means--. Column 30, lines 2 and 3, "mounted to have the first conveyor means linear run, and a" should be --mounted on the frame and having a longitudinally elongated linear run, and a--; line 28, "driving" should be --drive--. Column 36, line 11, "relasing" should be --releasing--. Column 37, line 19, "rans-" should be -- trans- --. Column 38, line 33, "weighted" should be --weighed--. Column 39, line 2, "mer" should be --ber--. Column 40, line 20, "conditions" should be --condition--.

SIGNED AND
SEALED
JUN 2 1970

(SEAL)
Attest:

Edward M. Fletcher, Jr.
Attesting Officer

WILLIAM E. SCHUYLER, JR.
Commissioner of Patents